United States Patent
Robinson

[15] 3,654,803
[45] Apr. 11, 1972

[54] SYSTEM FOR MEASURING ROTOR BLADE VIBRATION

[72] Inventor: Raymond A. Robinson, Lake Circle Drive, Tullahoma, Tenn. 37388

[22] Filed: Oct. 2, 1970

[21] Appl. No.: 77,628

[52] U.S. Cl. .............................................. 73/71.4
[51] Int. Cl. ............................................. G01h 11/00
[58] Field of Search ........................... 73/67, 70, 71.4

[56] References Cited

UNITED STATES PATENTS 3,058,339 10/1962 Shapiro .................................. 73/71.4
3,289,073 11/1966 Loeffler ............................... 73/71.4 X

*Primary Examiner*—James J. Gill
*Attorney*—C. A. Phillips

[57] ABSTRACT

A system for measuring rotor blade vibration in a compressor or turbine in which magnetic type sensors are positioned at selected points about the periphery of the rotor to produce pairs of signals generated by passing blades. These signals are then phase compared and a voltage obtained which is indicative of whether one signal leads or lags another and the magnitude of the lead or lag.

11 Claims, 19 Drawing Figures

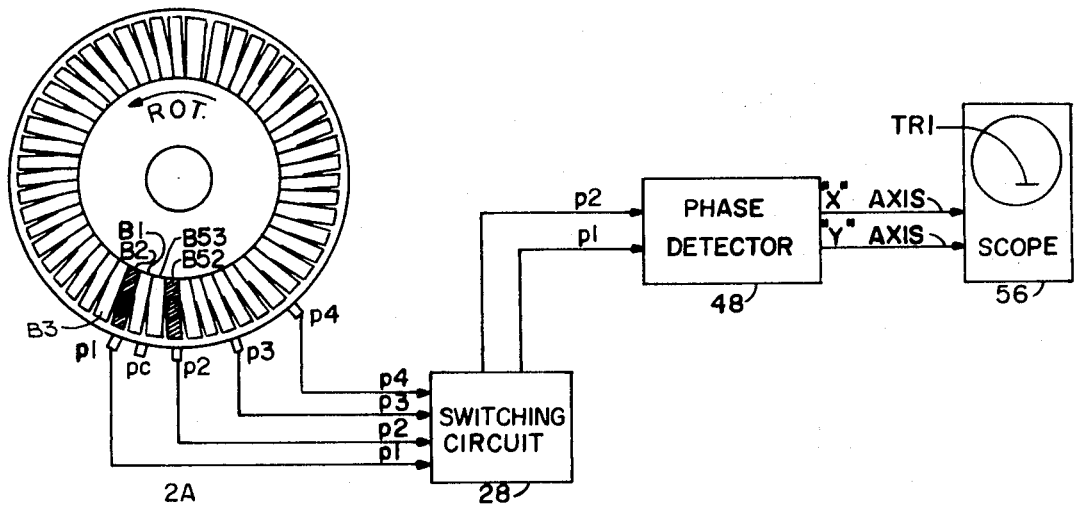
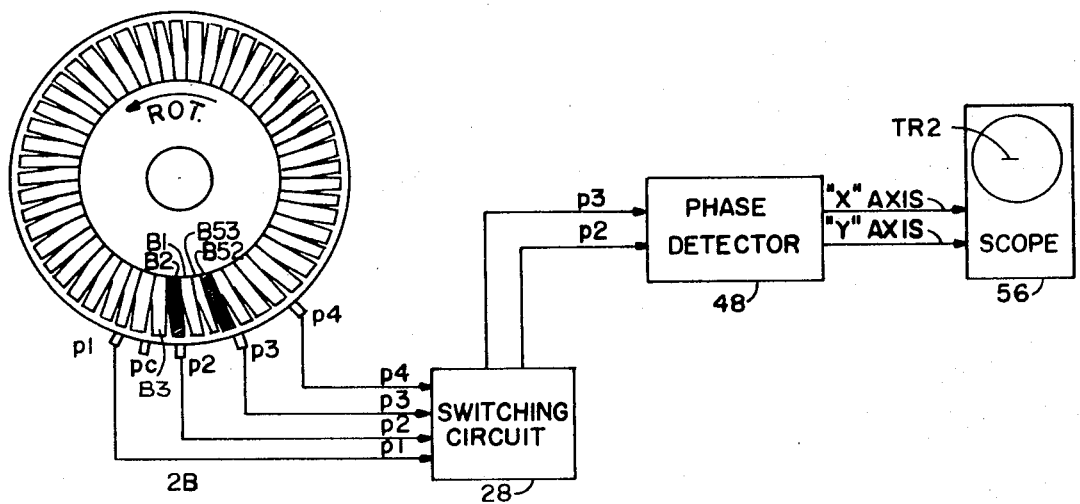
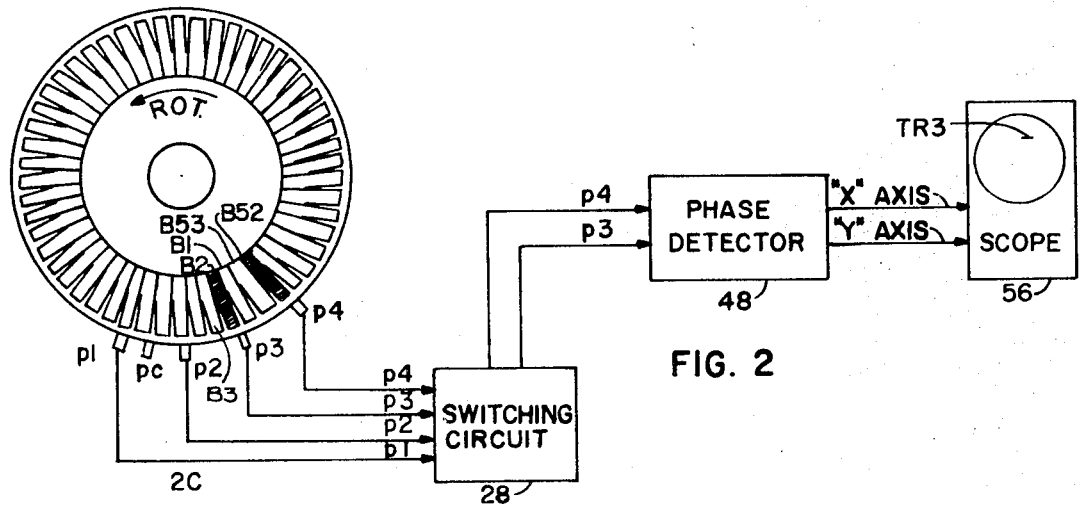
FIG. 2

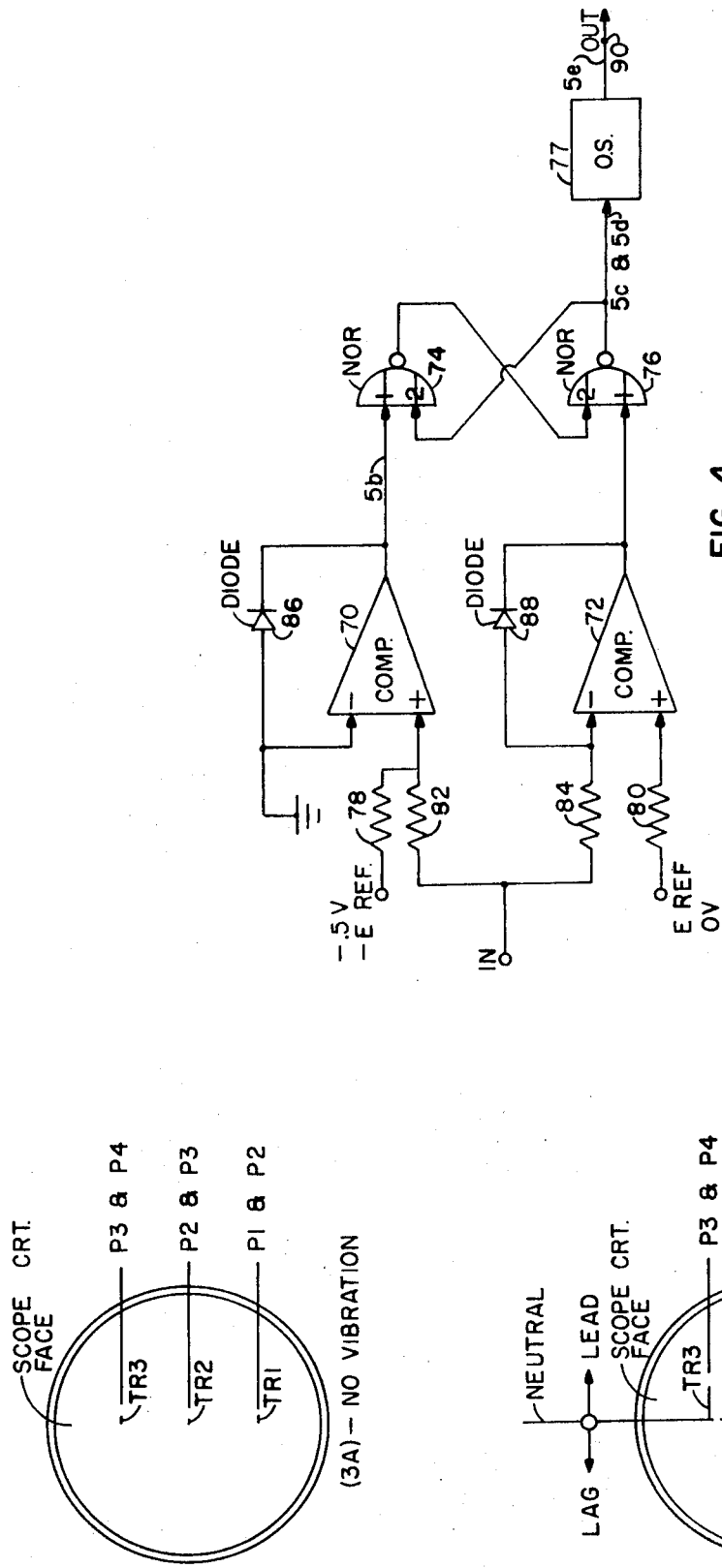

3,654,803

SYSTEM FOR MEASURING ROTOR BLADE VIBRATION

BACKGROUND OF THE INVENTION

This invention relates to the detection of vibration in axial flow turbines or compressors and particularly to a measurement system in which vibrations are detected by the comparison of waveforms generated by a selected pair of blades passing a pair of magnetic pickups which are spaced to symetrically sense the movement of blades passing the pickups.

It has been previously established that blade vibration of rotary compressors and turbines often forewarn of rotor failure and possible destruction of all of the blades in the compressor or turbine in which the vibrations are detected. It is therefore of acknowledged importance that some means be available to monitor rotor blade vibration.

SUMMARY OF THE INVENTION

It is an object of the present waveforms provide an improved system for measuring and comparing relative vibratory motion between rotor blades of a turbine or compressor.

In accordance with the invention, magnetic pickups are positioned on the periphery of a turbine or compressor, with at least two of them positioned to simultaneously detect the passage of a pair of selected blades. The magnetic pickups are separated by the distance between the blades being observed and the signals from these pickups, which as sensed, approximate a cycle of an alternating current wave, are translated into rectangular pulses in a manner which preserves their time identity. They are then time or phase compared and an electrical output produced which indicates by way of polarity which of the signals leads in time the other, if such is the case, and indicates, in magnitude, the extent of this lead or lag.

These and other objects, features and advantages waveforms invention will become more apparent from the following description and claims when considered together with the accompanying drawings.

BRIEF DESCRIPTION OF THE DRAWINGS

FIG. 2 is a diagrammatic illustration of the blade-magnetic pickup relationships at three stages of rotation of the turbine referred to in FIG. 1;

FIG. 3 is a diagram illustrating oscilloscope patterns provided as an output of the systems shown in FIG. 1;

FIG. 4 is an electrical schematic diagram of one of the three identical pulse shapers shown in FIG. 1 and which functions to convert magnetic input signals into precisely timed-related pulse signals;

DESCRIPTION OF THE ILLUSTRATED EMBODIMENT

Figure 1:
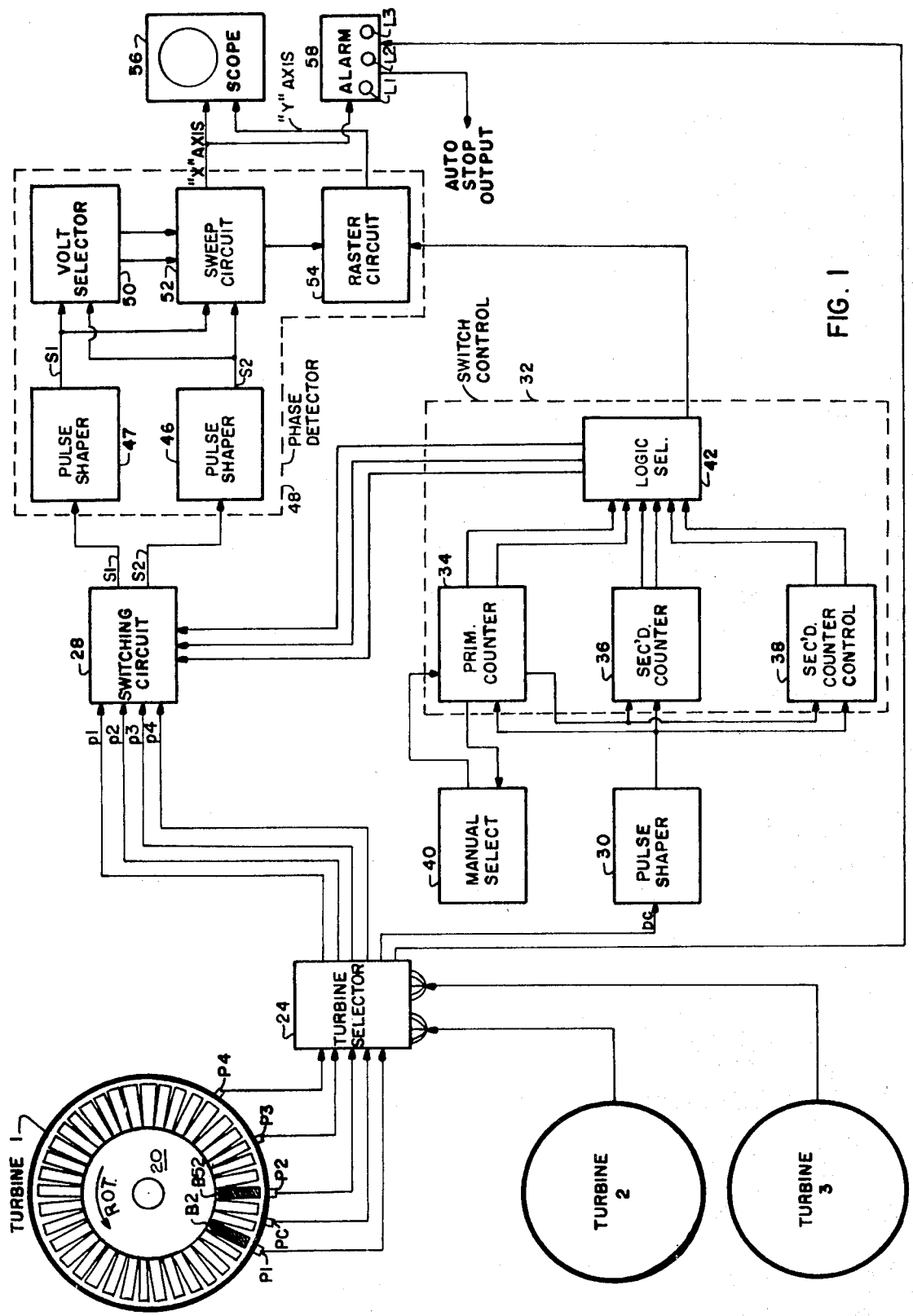
FIG. 1 is a overall schematic diagram of an embodiment of the invention.

Referring now to FIG. 1, magnetic pickups P1, P2, P3 and P4 are positioned about the periphery of turbine 1. Turbine 1 is of the type in which gas flow is axial. The pickups are equally spaced about one quarter of a wavelength apart around the circumference of turbine 1 as calculated from known natural frequencies of vibration of the blades generally designated. As shown, two blades are between the blades opposite pickups. They are positioned so that the trailing edge of two blades, for example, blades B2 and B52 will be opposite pickups (pickups P1 and P2 as shown), at a particular time. An additional magnetic pickup, pickup PC, which serves as a control signal pickup, is located so that when a blade of rotor 20 of turbine 1 is opposite it, blades are not over any of the other four pickups.

In order to best observe and detect vibration, the magnetic pickups spacings, two blades between the two being observed, is based upon the natural frequency of the turbine, and in terms of this frequency are spaced λ4 wavelengths apart. FIG. 2 shows in three progressive diagrams instantaneous rotor positions for three comparative measurements with respect to Blades 2 and 52, as turbine 1 rotates from the first position 2A to the second position 2B and from the second position to the third position 2C.

The outputs from pickups P1, P2, P3, P4 and PC associated with turbine 1 are fed to turbine selector 24 as are similar sets of outputs from other turbines, illustrated by turbines 2 and 3 on FIG. 1. Turbine selector 24 is a switch which makes available as selected, sets of magnetic pickup outputs, outputs to switching circuit 28 and, through pulse shaper 30, to switch control 32. As an aid in signal tracing, signal designations are in lower case letters and opposite numerals designate the outputs. Pulse shaper 30 amplifies the incoming pulses PC and provides a rectangular pulse output which is initiated at a predetermined point on the magnetic pickup signal and the pulse output is of a fixed width. The pulse serves as a trigger pulse which is applied to switch control 32 where it is fed to primary counter 34, secondary counter 36 and secondary counter control 38. Primary counter 34 functions to count N-1 pulses, there N is the number of turbine blades. Secondary counter 36 functions to count to 3 (the distance of blade travel from one pickup to another in terms of blade width) twice in succession each revolution, and secondary counter control 38 counts the number of times that secondary counter 36 counts the number of blades between pickups and resets secondary counter 36 after allowing secondary counter 36 to go through two counting sequences each revolution of turbine 1. Manual selector 40 functions to step primary counter 34 to cause the pair directly behind the pair of blades then being observed to be thereafter observed. Logic selector 42, which is controlled by outputs from primary counter 34, secondary counter 36 and secondary counter control 38 determine the timing of control signals applied to switching circuit 28, which in turn selectively passes input signals in the correct order for phase analysis. The output of switching circuit 28 consists of two selected input signals, for example, signals picked up from blades 2 and 52 as these blade pairs simultaneously are sensed by a pair of pickups. As will be noted, pickup P1 first senses blade 2 and P2 senses blade B52. Next pickup P2 senses blade B2 when pickup P3 senses blade B52, and finally pickup P3 senses blade B2 when pickup P4 senses blade B52. These signals, S1 and S2, are fed through one of the pulse shapers 46 or 47 to phase detector 48. Pulse shapers 46 and 47 function in the same manner as pulse shaper 30.

Phase detector 48 includes voltage selector 50, sweep circuit 52 and raster circuit 54. Voltage selector 50 functions to generate a positive polarity output if signal S1 leads signal S2 and a negative polarity output if signal S1 lags signal S2. Sweep circuit 52 functions to time the phase lead or lag and provide an output which is of the polarity indicated by voltage selector 50 and of a duration proportional to the degree or period of lead or lag. Raster circuit 54 functions to provide a stepped waveform with a discrete level for each of the three successive measurements made each revolution of turbine 1.

The outputs of phase detector 48, being the output of sweep circuit 52 and raster circuit 54 provide "X" axis and "Y" axis inputs to a oscilloscope 56. Thus oscilloscope 56 is caused to provide a multi-level display of input signals, as shown in FIGS. 2 and 3, indicating the magnitude of any lead or lag condition between signals for each of the three comparative measurements made each revolution of turbine 1. Thus, as a particular pair of blades are monitored, trace TR1, of FIG. 3 represents phase difference for a first measurement position (pickups P1–P2), trace TR2 for the second position (pickups P2–P3) and trace TR3 for the third position (pickups P3–P4).

Sweep circuit 52 also provides an input to alarm 58 which gives a visual or audible indication of a critical condition based on a selected magnitude of lead or lag. In order to indicate the particular turbine at fault, alarm 58 is also supplied a selector signal from turbine selector 24 indicating the particular turbine being observed which is indicated by the illumination of an appropriate light L1, L2, or L3.

Figure 5:
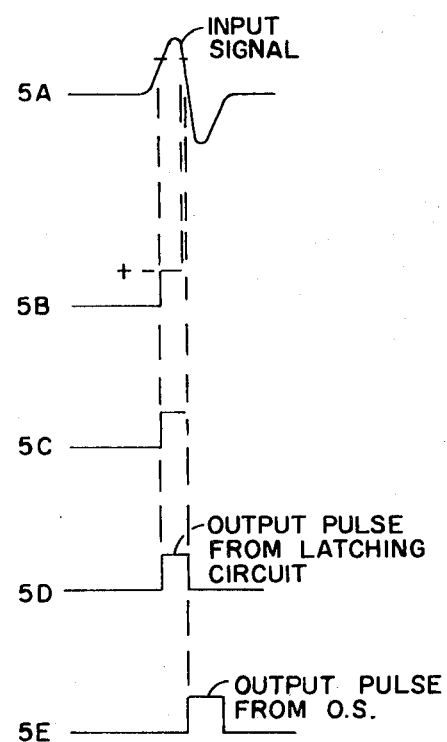
FIG. 5 shows a series of waveforms illustrating the operation of the pulse shaper of FIG. 4.

Pulse shapers 30, 46 and 47 are identical and one of these circuits is shown in detail in FIG. 4 with pertinent waveforms shown in FIG. 5. In each instance the pulse shaper receives a signal having the general shape of waveform 5A and provides a pulse output 5E which is of extremely uniform width and which has a leading edge which commences with the polarity crossover point between peaks of typical input signal 5A.

Each pulse shaper FIG. 4 consists basically of comparators 70 and 72, NOR-gates 74 and 76 and a one shot, or one shot multivibrator 77. A reference level, − 0.5 volts is applied through resistor 78 to the plus input of comparator 70 and a 0 voltage reference is applied through resistor 80 to the plus input of comparator 72. The signal input is applied to comparator 70 through resistor 82 and to comparator 72 through resistor 84. The resistors are of equal value. Diode 86 is connected between the negative input of comparator 70 (which minus input is grounded) and the output of comparator 70, and functions to prevent the output of comparator 70 from falling below 0. Similarly, diode 88 is connected between the negative input of comparator 72 and the output of comparator 72 and it prevents the output level from falling below the input signal level of comparator 72. NOR-gates 74 and 76 are cross-coupled to in effect provide a flip-flop configuration. In operation and referring to the waveforms of FIG. 5, FIG. 5A shows a typical circuit input from one of the magnetic pickups. As the voltage rises, nothing occurs until the input voltage equals the reference voltage and thus above this point there is applied a positive voltage to the positive input of comparator 70. This produces the waveform shown in FIG. 5B at the output of comparator 70. With a positive input applied to the negative input of comparator 72 there is no reaction in comparator 72 and a 0 output is applied on input 1 of NOR-gate 76. The result is that a positive or "1" level voltage is applied to input 1 of NOR-gate 74 and a "0" is applied to input 2 of NOR-gate 76. The result is there will be a "0" output from NOR-gate 74 applied to input 2 of NOR-gate 76 and the "1" output of NOR-gate 76 will be applied to input 2 of NOR-gate 74. Thus as shown in FIG. 5D, there is an abrupt transition when the input signal rises above the reference level applied to comparator 70. Next, the input voltage falls back to the reference level but as there is still a "1" input on input 2 of NOR-gate 74 there remains a "0" output on NOR-gate 74 and thus no change in the output of NOR-gate 76, which provides a "1" input to one shot 77.

Figure 15:
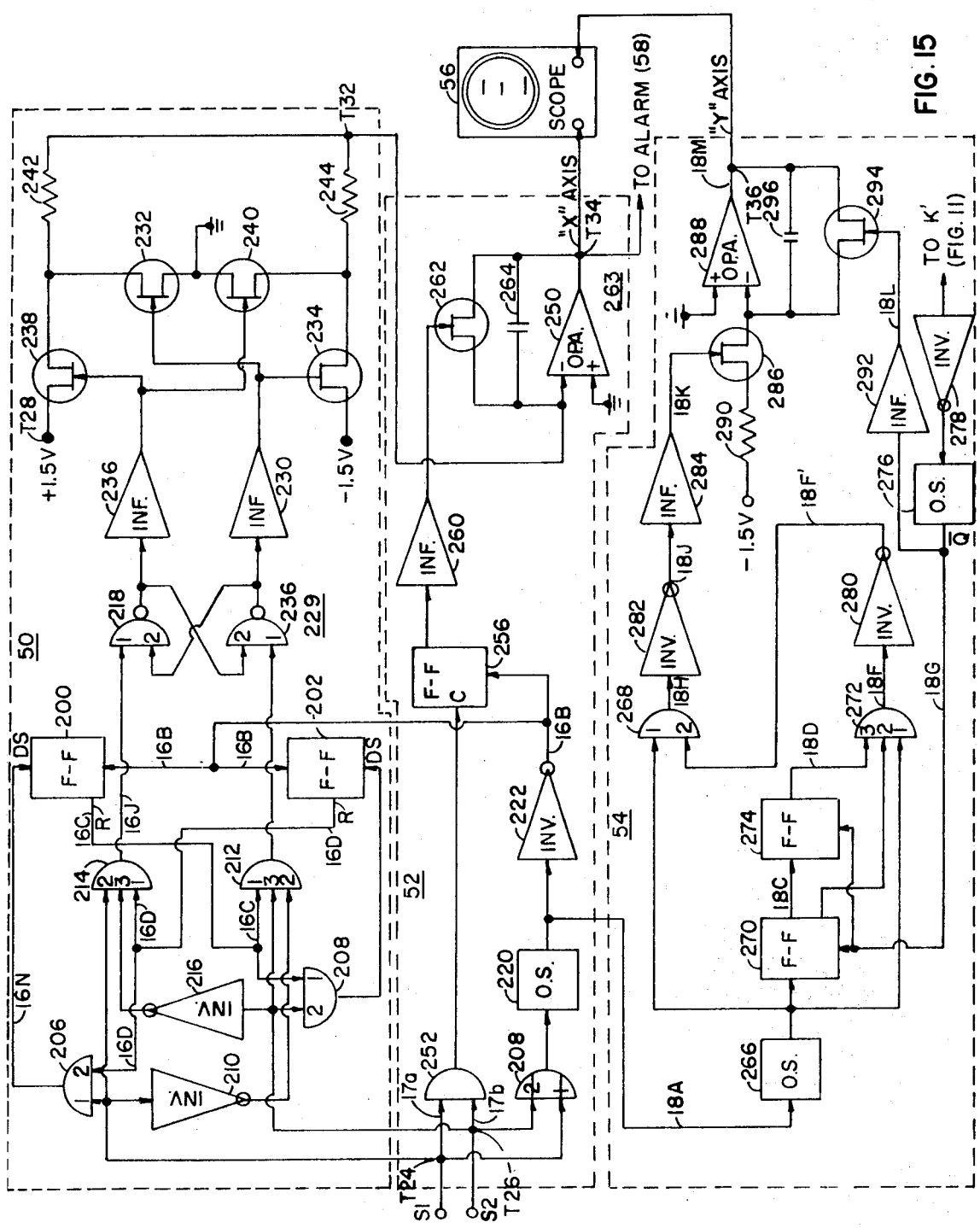
FIG. 15 is an electrical schematic circuit diagram of the phase detector shown in FIG. 1 which functions to time or phase compare two input blade signals and to provide an electrical output of a polarity indicating whether one signal leads or lags the other and of a magnitude indicating the magnitude of the lead or lag; in addition the phase detector provides a stepped voltage output which identifies in time a particular measurement out of a series of measurements being made during a given revolution of the turbine.

Next, when the input voltage drops to 0 and starts to go negative there will be a differential input to comparator 72 of the appropriate sign and, there occurs a positive output of comparator 72 during the negative portion of the input waveform 5a. With the rise in voltage at the output of comparator 72 there is thus provided a "1" input to input 1 of NOR-gate 76 and this causes NOR-gate 76 to provide a "0" output and an abrupt drop, or trailing edge of the pulse, shown in 5d. This trailing edge triggers one shot 77. This also causes a "0" input to be fed to input 2 of NOR-gate 74 and causes the circuit to reverse its state. The result is that we have an extremely accurately timed pulse 5d for application to the input of one shot 77. As stated, one shot 77 is triggered by the trailing edge of waveform 5d and it provides in response a very uniform width pulse 5e which appears on terminal 90. The corresponding terminal for shaper 30 is T1 (FIG. 6), for shaper 46 is T26 and for shaper 47, is T24 (FIG. 15). By virtue of the circuitry just described the time of initiation of pulse 5e, which is the point between peaks when the signal goes through 0, is extremely consistent signal to signal, and constant pulse width is fixed precisely by one shot 77.

Figure 6:
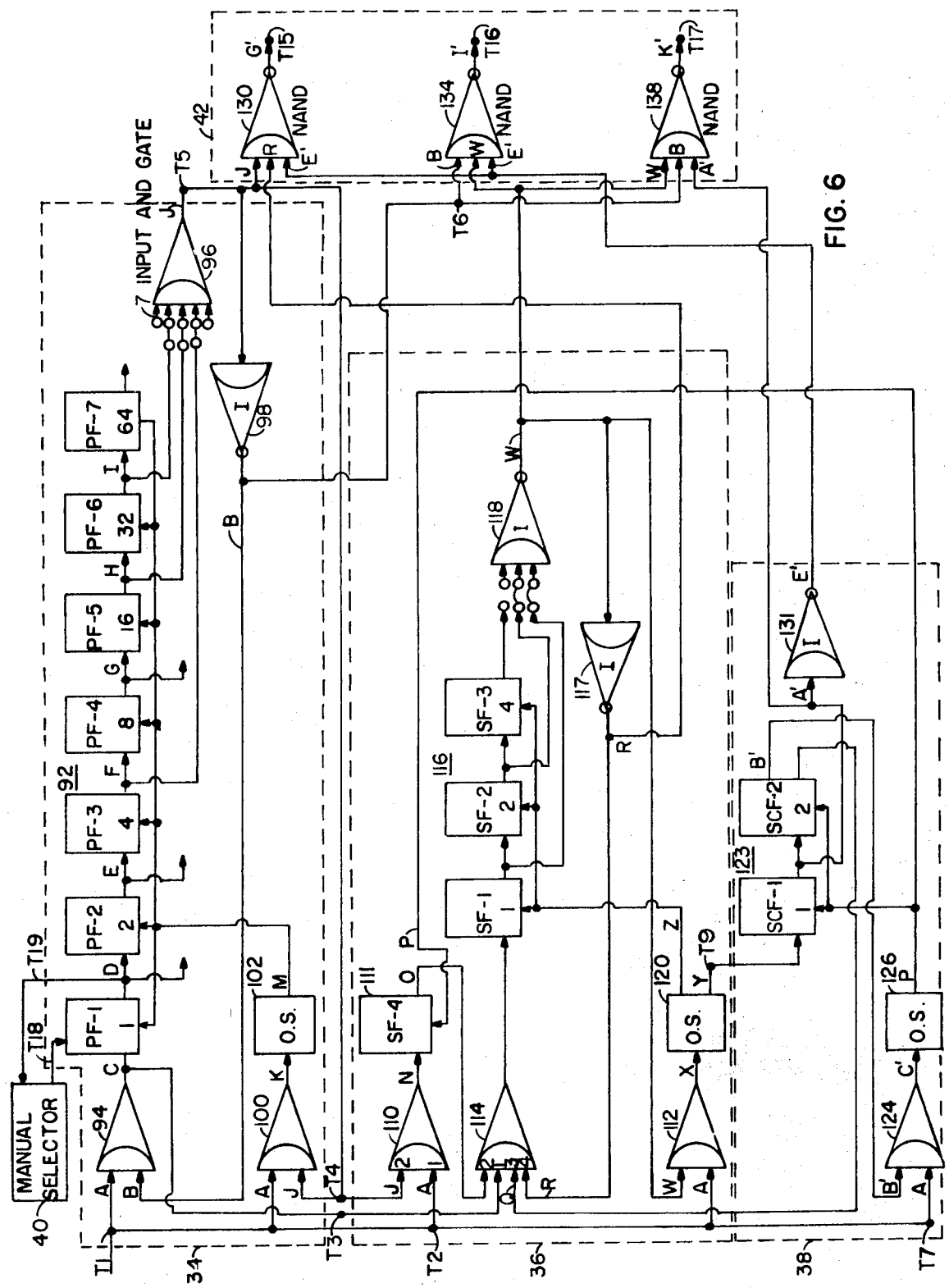
FIG. 6 is an electrical circuit diagram of a switch control shown in FIG. 1 and which develops timing pulses related to the position of turbine blades with respect to magnetic pickups which sense their passage; blade

FIG. 6 shows in greater detail switch control 32 and it will be examined together with the FIGS. 7–10 showing timing charts of the waveforms pertinent to the operation of switch control 32. Switch control 32 consists of primary counter 34, secondary counter 36, secondary counter control 38 and logic selector 42.

Primary counter 34 counts the blades passing control pickup PC and provides an output J (FIG. 7) when all blades have passed, and a full count is reached, indicating a complete revolution of turbine 1. At all other times it provides as a separate output, output B.

Secondary counter 36 starts counting the blades that pass control pickup PC after primary counter 34 has provided an indication of one complete revolution of turbine 1. The secondary counter then counts the passage of the number of blades that pass control pickup PC and that indicates blades B2 and B52 have advanced to positions just ahead of magnetic pickups P3 and P3. It then puts out a It then puts out a signal, W, (FIG. 8) that allows blades B2 and B52 to be observed. It also provides, as a separate output, output R, at all other times. The next pulse from PC occurs at a later time and resets the above action a second time and then flip-flop SF–4, number 111, is reset which turns off the secondary counter 36.

Secondary counter control 38 counts the number of full counts of secondary counter 36 and provides an output Q (FIG. 9) to reset, and thus turns off, secondary counter 36 after secondary counter 36 has counted twice in one revolution of turbine 1. Secondary counter control 38 also provides an output $A^1$ between the end of the first count and beginning of the second count of secondary counter 36 in one revolution and, as a separate output, output $E^1$ at other times.

Logic selector 42 appropriately combines the outputs J, R, B, W, $A^1$ and $E^1$ (FIG. 10) to provide keying outputs $G^1$, $I^1$, and $K^1$ which control switching circuit 28 to pass signals from pickups P1–P4 in the proper combinations and order to achieve the desired phase detection of signals in phase detector 48.

Switch control 32 is controlled by pulse train A (FIG. 7) which is received from pulse shaper 30 and it appears on terminals T1, T2 and T7. It consists of a rectangular pulse for each passage of a blade by a control pickup PC.

Figure 7:
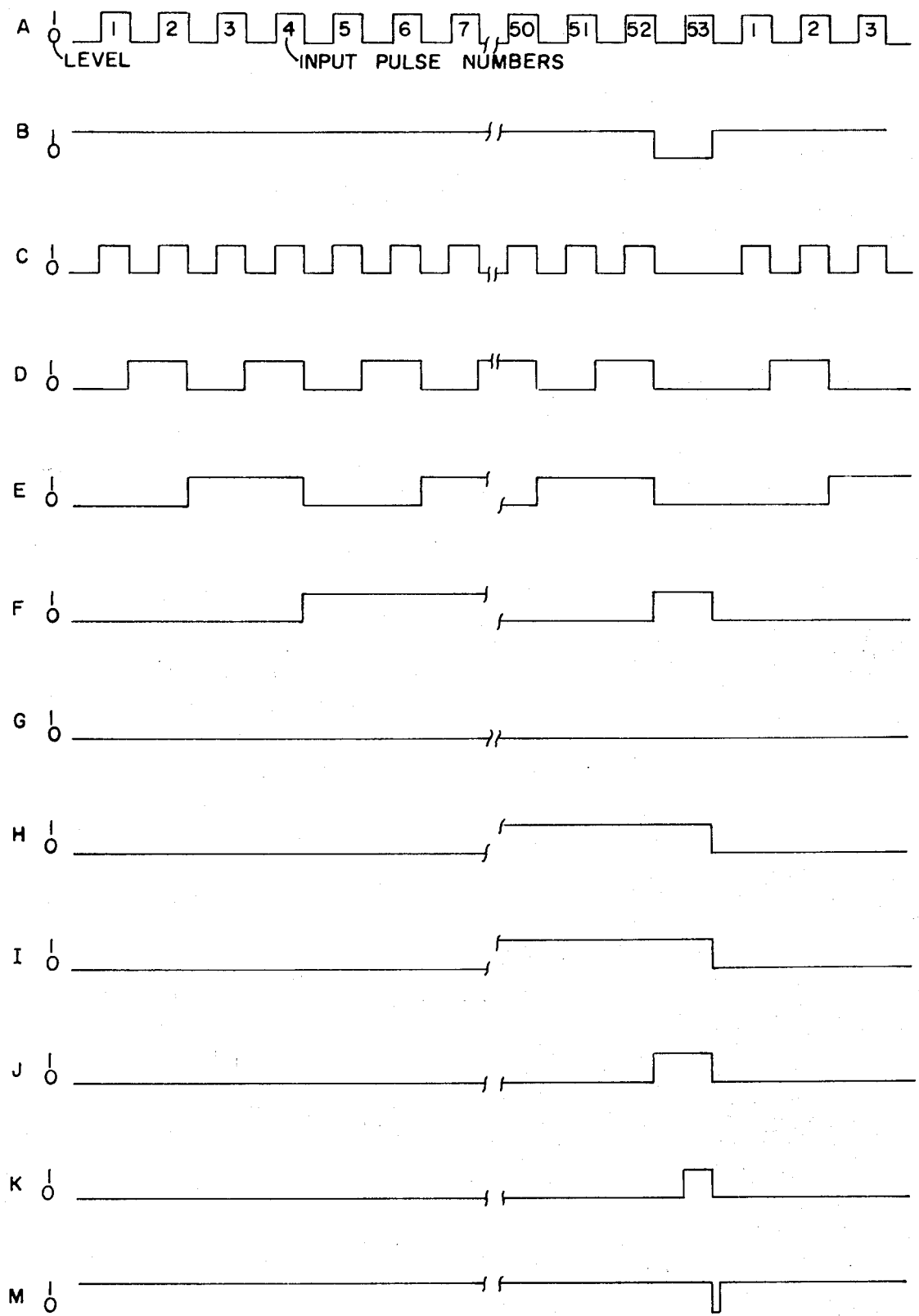
FIG. 7 is a timing chart showing waveforms generated by the primary counter of the switch control shown in FIG. 1.

Considering now in detail primary counter 34, and the waveforms shown in FIG. 7, binary counter 92 consists of 7 flip-flops, PF1–PF7, wherein the set output of one flip-flop is coupled to the trigger input of the next flip-flop. Binary counter 92 functions to count N−1 pulses, where N is the number of turbine blades being monitored. As shown, counter 92 is capable of monitoring a turbine with 128 blades and thus N equals 127. Turbine 1 has only 53 blades and N equals 53. Thus only set outputs of flip-flops PF3, 5 and 6 are connected to the input of AND-gate 96, which gates on a complete count of 52. The set outputs of flip-flops 1, 2, 4 and 7 are left disconnected. To accommodate a turbine of a different number of blades, an appropriate "count" connection would be made between the flip-flops and AND gate 96.

The waveforms shown in FIG. 7 appear at correspondingly labeled points in FIG. 6. Waveform A in our example, is a train of 53 pulses representing one revolution of the 53 blades of the turbine 1. The discontinuity in the pulse train (FIG. 7A) between pulses 7 and 50 is for clarity only; the actual pulse train is continuous.

To examine binary counter 92, it is assumed that all flip-flops initially have "0" level set outputs before pulse 1 arrives. In order to provide an output C, which is applied to flip-flop F1, it is necessary that the 2 inputs to AND-gate 94, wave forms A and B, both be at a "1" level. Wave form B, which is obtained from the output of inverter 98, in turn fed from the output of AND-gate 96, is at a "1" level at all times except when the counter is full, being between the trailing edges of pulses 52 and 53. Thus, normally AND-gate 94 is controlled by input pulse A and applies an output pulse C to flip-flop 1 with each pulse A. Flip-flop PF1 changes state each time wave form C changes from a "1" level to a "0" level to provide wave form D. Flip-flops PF2–PF7 change levels each time the preceding flip-flop changes from the "1" level to the "0" level and provides progressive outputs E–I. The numbers in the lower portion of the flip-flops represent the binary count of that particular flip-flop. Wave forms F, H and I are the effective inputs to AND-gate 96 to provide a full count of 52. As the trailing edge of input pulse 52, wave form F assumes the "1" level. Since wave forms H and I are already at the "1" level and therefore the output of AND-gate 96, wave form J, assumes a "1" level. The output of AND-gate 96 appears at terminal T5 and is fed back through inverter 98 as T5 as an input B to AND-gate 94 as previously described.

Wave forms A and J form inputs to AND-gate 100, and wave form K, the output of AND-gate 100, assumes a "1" level during pulse 53. Pulse K is applied to one shot 102 to provide wave form M, which is a short duration pulse which occurs as wave form K changes from the "1" level to the "0" level. This produces a short delay to insure that counter 92 completed a cycle and has reached a steady state before the flip-flops are reset. The reset pulse is delivered from the output of one shot 102, waveform M. It is applied to the reset input of each flip-flop. Thus as waveform M changes from the "1" level to the "0" level, the set outputs of the flip-flops change from the "1" level to the "0" level. Thus primary counter 34 has counted to 52 and as counting is blocked for one count by pulse B, a complete revolution of turbine 1 occurs before counting may start again. During the period from the end of count 52 to 53 there is provided a "1" output J on terminal T5. Output B appears on terminal T6.

With all flip-flops at the "0" level, counter 92 is ready to begin counting again with input pulse 1, provided as blade B1 again passes pickup PC. The reference to blade B1 is arbitrary, depending upon the blade passing control pickup PC at the time that the circuitry is energized. Actually, as will be further explained with respect to manual selector 40, the reference blade may be shifted one blade at a time and thus permitting comparison of different pairs of blades for vibration.

The interconnections to primary counter 34 are as follows. Terminals T2, T3 and T4 represent connections to secondary counter 36, terminals T5 and T6 represent connection to logic selector 42 and terminals 18 and 19 are connections to manual selector 40.

Figure 8:
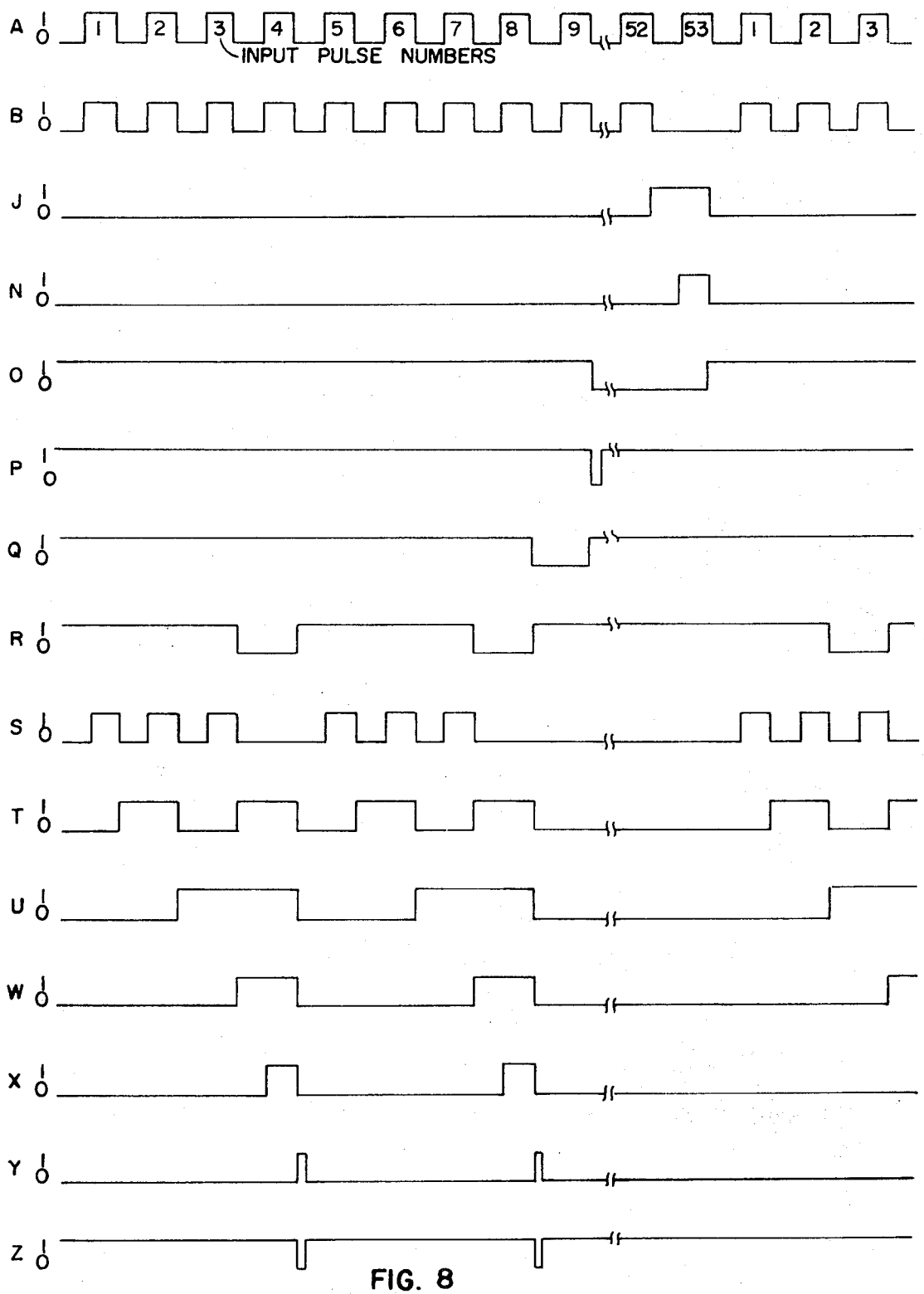
FIG. 8 is a timing chart showing waveforms generated by the secondary counter of switch control shown in FIG. 1.

Secondary counter 36 functions to count to 3 twice during each full count of primary counter 34, thus counting to 3 twice during each revolution of turbine 1. FIG. 8 shows a timing chart for various waveforms pertinent to secondary counter 36. It is to be noted therein that a discontinuity in the pulse train occurs between input pulse 9 and pulse 52. Actually, the pulse train is continuous. Pulse trains are broken in this manner to illustrate the waveform generated within secondary counter 36. The pulse trains are generated external to secondary counter control 36. Secondary counter 36 provides logical output pulses W to logic selector 42 in the form of "1" level pulses at the end of pulse 7, each lasting until the end of the next pulse. Thus when considered together with pulse J from primary counter 34, it will be noted that we have three output keying pulses which are separated by three blade pulses. Since, pickups are spaced with two blade positions between pickups, these output pulses J and 2 W pulses, provide a basis for keying pulses $L^1$, $M^1$ and $N^1$ (FIG. 11) as will be further discussed with respect to switching circuit 28. The keying pulses provide for three measurement observations per revolution. The timing is such that coincident with pulse J (and $L^1$) pickup P1 observes blade B2 and pickup P2 observes blade 52, when rotor 1 has moved around three blades the first W pulse ($M^1$) occurs and pickup P2 observes blade B2 and pickup P3 observes blade 52. Then when the rotor has advanced another three blades, in coincidence with the second "W" pulse (and $N^1$) pickup P3 observes blade B2 and pickup P4 observes blade B52. As stated above the blade designations are arbitrary and by means of manual selector 40 different sets of blades may be so designated.

Considering now the operation of secondary counter 36, it is assumed that all flip-flops have "0" level set output before input pulse "1" begins, and the waveforms are valid after the first complete pulse train of waveform A. This is after primary counter 34 has counted N −1 blades.

With a full count output to AND-gate 96, waveform J assumes the "1" level which is applied to input 2 of AND-gate 110. At the same time, input pulse 53 of waveform A, at a "1" level, is applied to input 1 of AND-gate 110 and this gates AND gate 110 to provide a "1" level output as shown by waveform N.

As waveform N changes from the "1" level to the "0" level, this negative going pulse is applied to flip-flop SF4 which provides a transition in waveform 0, the output of flip-flop SF4, from the "0" level to the "1" level and it remains at the "1" level until it is reset. Waveform 0 is applied as an input 2 to AND-gate 114. At this time, with input waveforms O, Q and R (inputs 2, 3 and 4) applied to AND-gate 114 at the "1" level, input pulses 1, 2 and 3 of waveforms C will each enable AND-gate 114 as indicated by waveform S and the three sets of three pulses are applied to binary counter 116. Binary counter 116, consisting of flip-flops SF1, SF2 and SF3 then counts 3 and the resulting set outputs of flip-flops 1 and 2 are applied to AND-gate 118, and output waveform W of AND-gate 118 changes from the "0" level to the "1" level. This occurs twice per revolution of turbine 1. It is to be noted that the set output of SF 3 is not used as only a count of 3 is needed in this case in which pickup spacing is set with two blades between pickups. If greater spacing is used counter 116 would be modified accordingly. It is to be noted that waveform Q, which is at a "1" level except between the end of pulse 8 and pulse 9, is obtained from secondary counter control 38 and that waveform R is from inverter 117 which provides a "1" level except when there is a full count output of binary counter 116.

With a full count of 3, indicating that three blades have passed control pickup PC, waveforms A and W are applied to AND-gate 112 and as they are at a "1" level, AND-gate 112 provides output waveform X at the "1" level coincident with input pulses 4 and 8. As waveform X goes from the "1" level to the "0" level, it causes one shot 120 to produce a short duration pulse Y which signals to secondary counter control 38, (terminal 9) that the three counts have occurred. Pulse z, which is the reset output of one shot 120, is applied to the reset input of flip-flops SF1, SF2 and SF3 and these flip-flops are reset for a new count. Thus flip-flops SF1 and SF2 count 3 again during pulses 3, 6 and 7. Input pulse 8 is blocked by AND gate 114 by waveform R in the same manner as input pulse 4 was blocked. During the transition of input pulse 9 from the "1" level to the "0" level, flip-flop SF4 is reset by waveform P obtained from secondary counter control 38 to enable secondary counter 36 for the next revolution of turbine 1, and secondary counter 36 is turned off until waveform J goes to the "1" level again at the trailing edge of the N−1 pulse.

As stated above, primary counter 34 counts the blades passing control pickup PC and provides an output J when all blades have passed, indicating a complete revolution. Secondary counter 36 in turn counts the number of blade width movements necessary for a blade to move between pickups or 3 in the configuration illustrated in FIGS. 1 and 2. Secondary counter control 38 resets secondary counter 36 after secondary counter 36 has gone through two counting sequences which are completed at the end of the seventh input pulse during each revolution of turbine 1.

Figure 9:
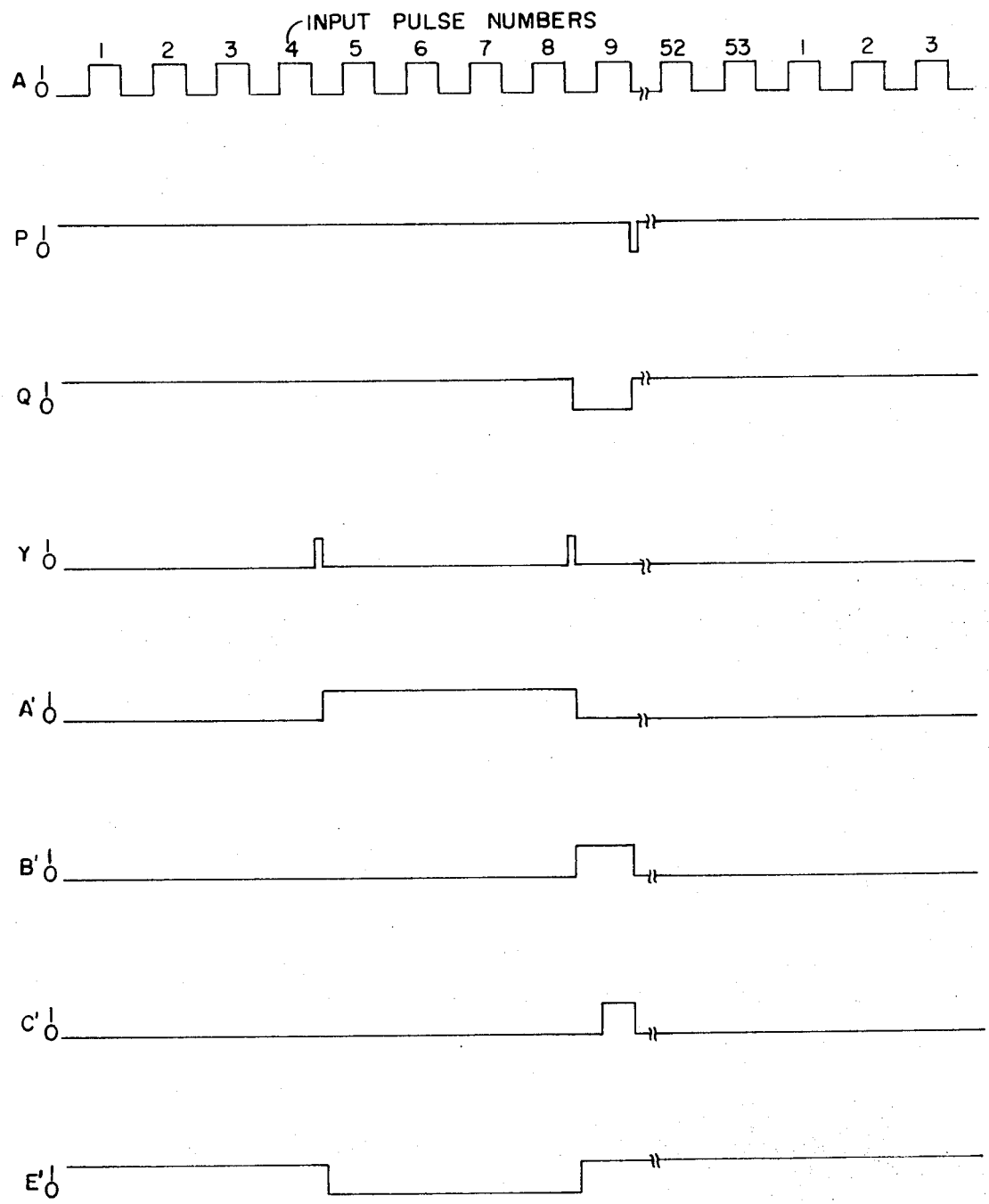
FIG. 9 is a timing chart showing waveforms generated by the secondary counter control of the switch control shown in FIG. 1.
Figure 10:
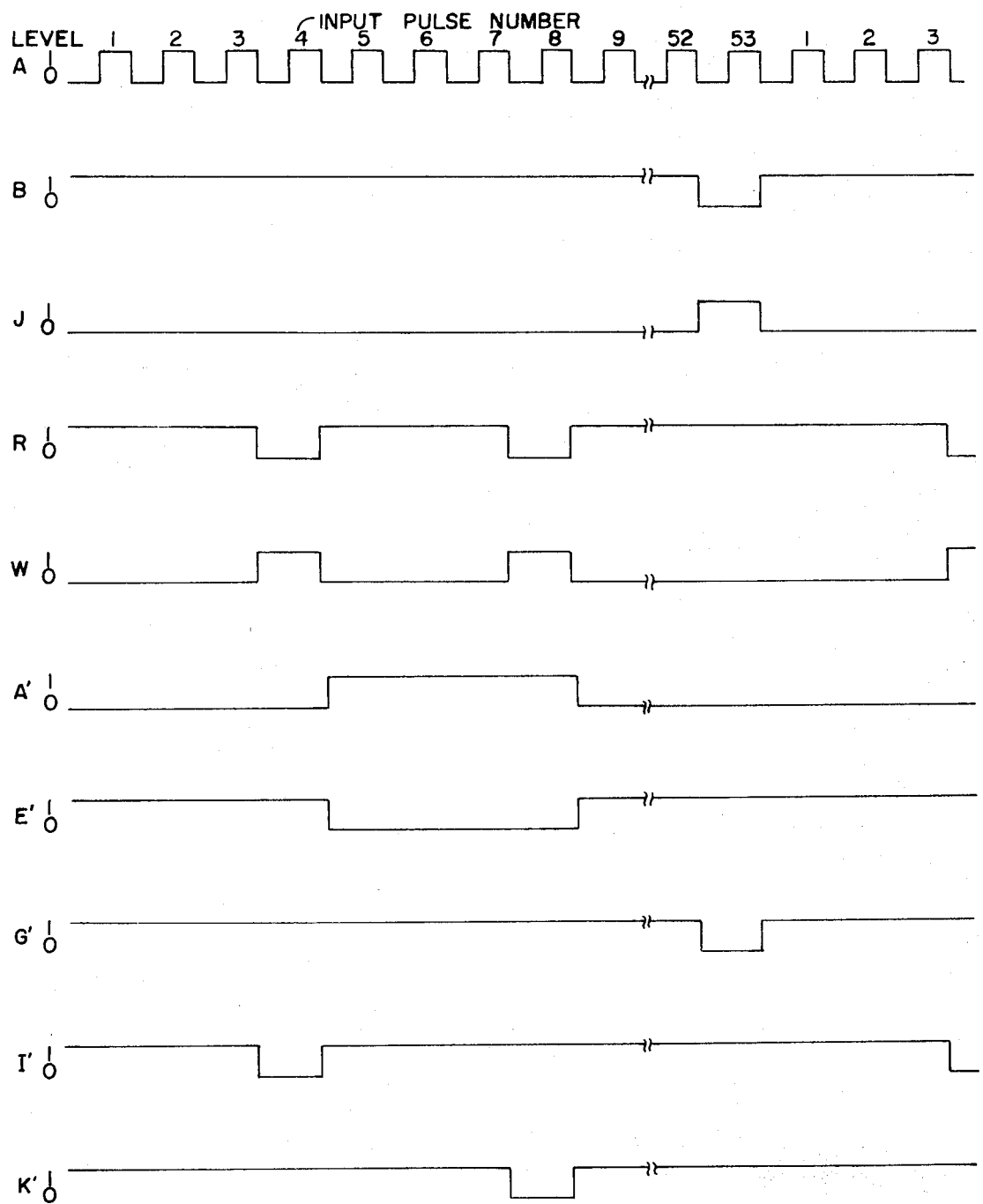
FIG. 10 is a timing chart of waveforms developed by the logic selector circuit of the switch control shown in FIG. 1.

Referring now specifically to secondary counter control 38 and to FIG. 9 which is a timing chart for secondary counter control 38, pulse train A, appearing on terminal 7, is applied to one input of AND-gate 124 and waveform Y, appearing on terminal 9 is applied to the input of flip-flop SCF 1 of two stage binary counter 123. Waveform Y is supplied by secondary counter 36 and consists of a pulse at the end of each full count of secondary counter 36. Counter 123 is connected to count to 2, as shown, and thus flip-flop SCF 2, the second stage of counter 123, functions to provide a set output $B^1$ each time there is a transition from the "0" level to the "1" level in response to the second pulse Y from one shot 120 of secondary counter 36 that is when it goes from the "1" level to the "0" level. Pulse Y is shown in FIG. 7 and pulse $B^1$ in FIG. 9. When counter 123 has counted to 2, that is after counter 116 has reached a full count twice, pulse $B^1$, together with pulse A, operate AND-gate 124 causing an output $C^1$ to be applied to one shot 126. The trailing edge of pulse $C^1$, the input to one shot 126, causes it to provide a short duration pulse $P^1$ which resets flip-flops SCF 1 and SCF 2. Also, pulse P resets flip-flop SF 4 of secondary counter 36. Waveform Q is the reset output of flip-flop SF2 and it is identical with the inversion of $B^1$. Waveform Q is applied to AND-gate 114 of secondary counter 36 and it blocks AND-gate 114 during pulse 9. Waveforms $A^1$ and $E^1$ are inputs to logic selector 42.

Figure 12:
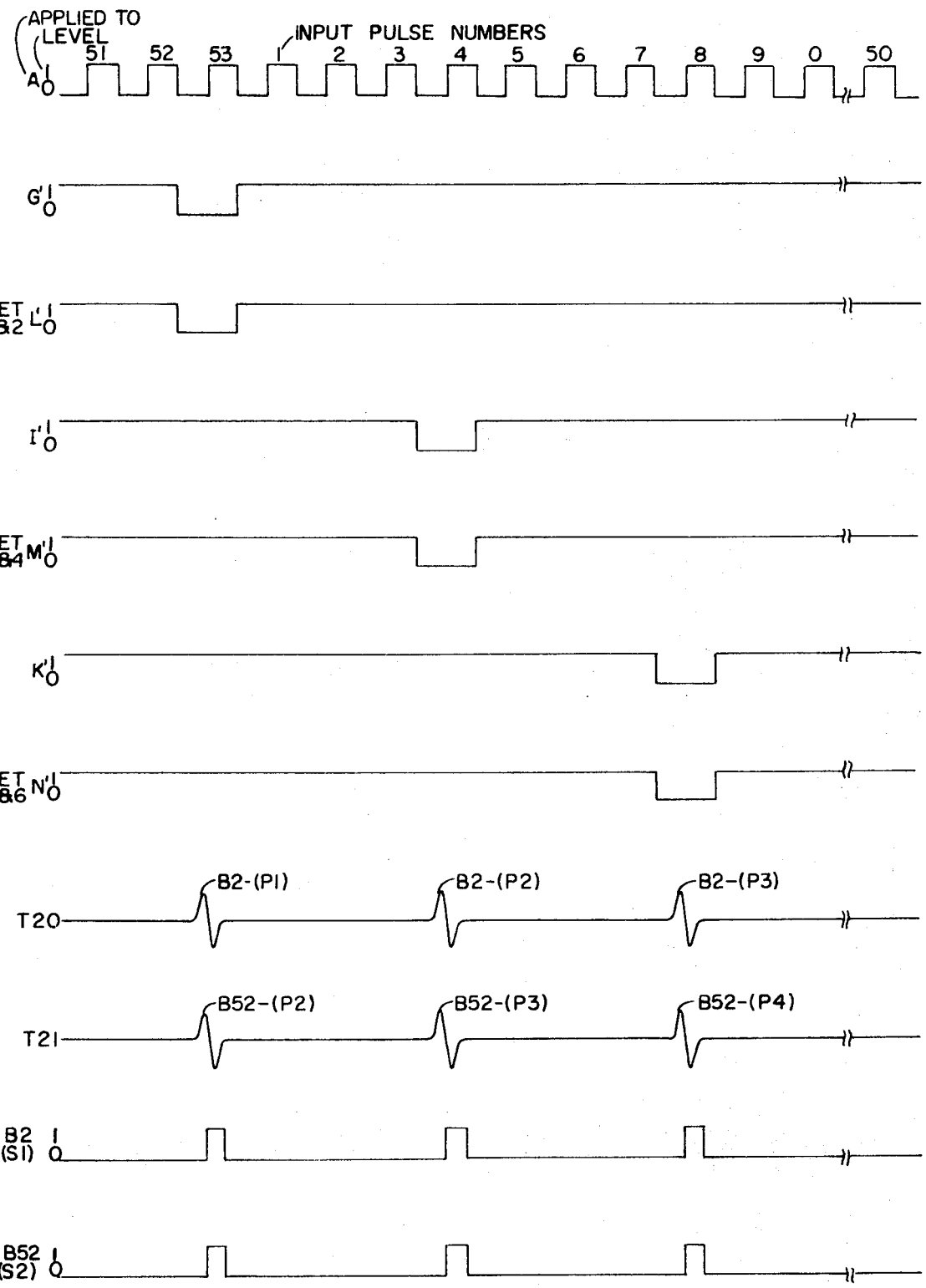
FIG. 12 is a timing chart illustrating the operation of the switching circuit shown in FIG. 11.

Logic selector 42 combines waveforms from primary counter 34, secondary counter 36 and second counter control 38 in a manner necessary for logically controlling switching circuit 34 to achieve passage of blade signals in the manner illustrated in FIG. 12, the timing chart for switching circuit 28, which is driven by logic selector 42. A timing chart for logic selector 42 showing waveforms generated therein is shown in FIG. 12.

Waveforms J, R, $E^1$, which are applied to NAND-gate 130, must be at a "1" level before the output of NAND-gate 130 can be at the "0" level. Waveform J is obtained from the output of AND-gate 96 of primary counter 34 and is at a "1" level once every 53 pulses. Waveform R is obtained from the output of invertor 117 of secondary counter 36 and is at a "1" level except between the end of pulse 3 and the end of pulse 4 and between the end of pulse 7 and end of pulse 8. Waveform $E^1$ is obtained from the output of inverter 131 of secondary counter control 38 and is at a "1" level except between the ends of pulses 4 and 8 and thus is at a "1" level during pulse 53. Waveform $G^1$, the output of NAND gate 130 is primarily controlled by waveform J going to the "1" level with the end of input pulse 52. It goes back to the "1" level at the end of input pulse 53. Thus waveform $G^1$ is at a "0" level which lasts from the end of pulse 52 until the end of pulse 53.

The inputs of NAND-gate 134 are waveforms B, W and E and they must be at a "1" level before NAND-gate 134 can be at a "0" level. Waveform B is obtained from the output of inverter 98 of primary counter 34 and it is at "1" level except from the end of pulse 52 until the end of pulse 53. Waveform W is generated at the output of AND-gate 118 of secondary counter 36 and is at a "1" level from the end of pulse 3 to the end of pulse 4 and from the end of pulse 7 to the end of pulse 8. The output of NAND-gate 134, output waveform $I^1$ makes the transition from the "1" level to the "0" level at the end of input pulse 3, remains at the "0" level until the end of input pulse 4, and then returns to the "1" level until the end of input pulse 3 occurs again.

The inputs to NAND-gate 138 are waveforms B, W and A. Waveform $A^1$ is the output of flip-flop SCF1 of secondary counter control 38 and is at the "1" level from the end of pulse 4 until the end of pulse 8.

The output of AND-gate 138 is waveform $K^1$ which is at the "0" level from the end of pulse 7 until the end of pulse 8.

The inputs to AND-gates 130, 134 and 138 are as have been explained, derived from primary counter 34, secondary counter 36 and secondary counter control 38. Primary counter 34 counts N −1 blades and remembers when to start counting over again. Secondary counter 36 counts the number of blades between pickups +1 and secondary counter control 38 remembers how many times to let the secondary counter count and when to stop counting. In this case it permits the secondary counter to count to 3 twice.

Figure 11:
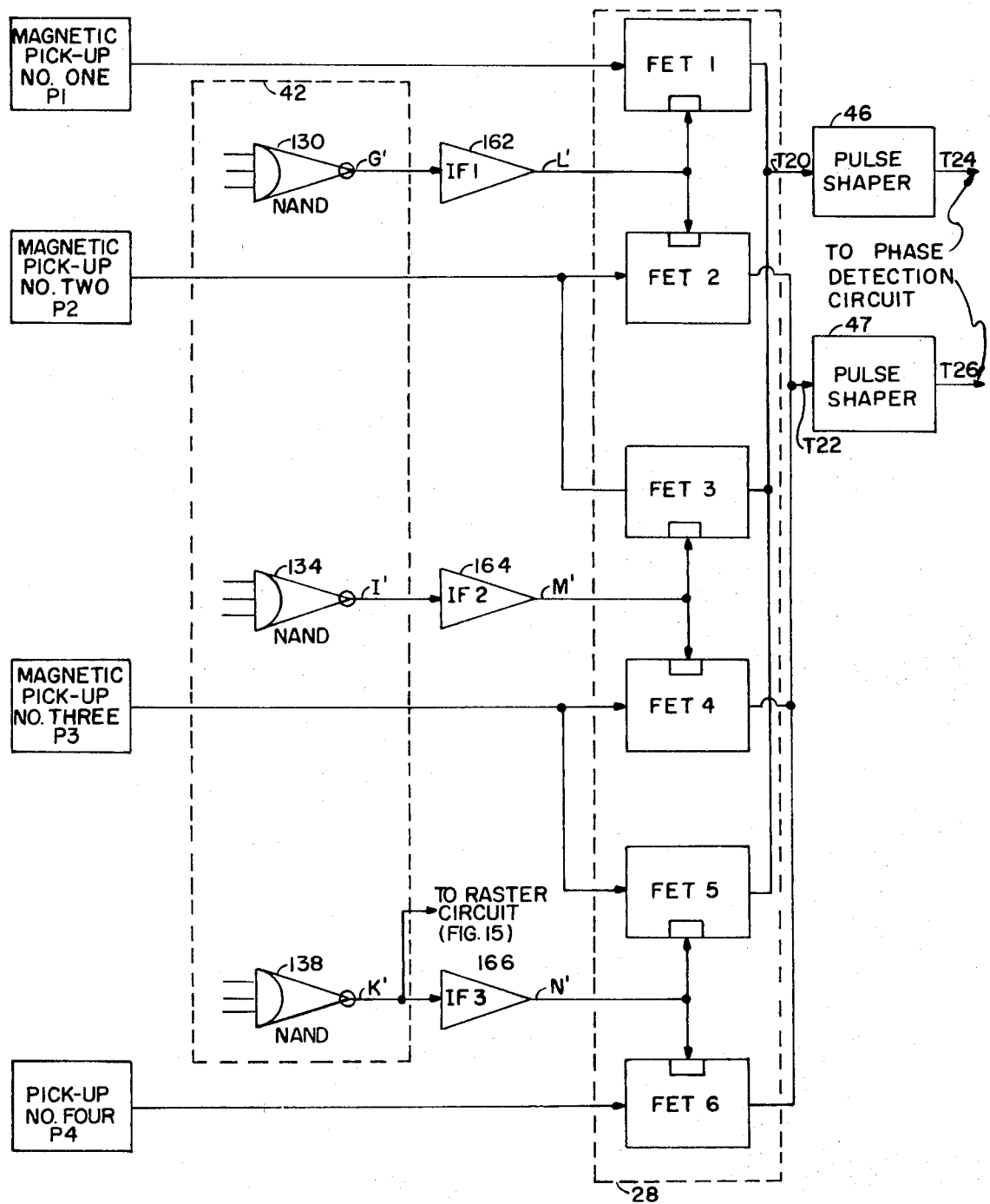
FIG. 11 is an electrical schematic diagram of the switching circuit shown in FIG. 1 which functions to receive magnetic pickup signals and timing pulses and provides as outputs two selected signals for analysis.

Referring now to switching circuit 28, shown in FIG. 11, this circuit determines which pair of pulses received from the magnetic pickups is to be applied as inputs to phase detector 48. A timing chart illustrating its operation is shown in FIG. 12. Switching circuit 28 consists basically of field effect transistor (F.E.T.) switches FET 1–FET 6 and interfaces or polarity inverters IF 1, IF 2 and IF 3. The signal leads of magnetic pickups P1, P2 and P3 and P4 are connected to the "drain" electrodes of FET switches FET 1–FET 6. As shown, the output of pickup P1 is applied to the drain input of FET 1, the output of pickup P2 is applied to drain inputs of FET 2 and FET 3, the output of P3 is applied to the drain inputs of FET 4 and FET 5, and the output of pickup P4 is applied to the drain input of FET 6. Referring to FIG. 12, it is noted that waveform A is again repeated to illustrate the levels of various waveforms with respect to input pulse numbers. Waveforms $G^1$, $I^1$ and $K^1$ from logic selector 42 are the inputs to interfaces IF 1, IF 2 and IF 3 respectively. An interface or polarity inverter is used to change voltages to meet desired levels. Thus the "1" level of waveform $G^1$ is +8 volts, and this is changed to −8 volts for the "1" level of waveform $L^1$ by interface IF 1. The "0" level on waveform $G^1$ is 0 volts and this remains at 0 volts for the "0" level of waveform $L^1$ by interface IF 1. Similar relationships are true for the pair of waveforms $I^1$ and $M^1$ and $K^1$ and $N^1$. The outputs of interfaces IF 1–IF 3 are connected to F.E.T. switch gate electrodes. As shown, the outputs of FET 1, 3, 5 are combined to provide a first output at terminal T20 and, as will be noted in FIG. 12, it provides for the passage of waveforms corresponding to blade B2 as it is successively picked up by pickup 1, 2 and then 3. The outputs of FET 2, 4 and 6 are combined to provide a second output at terminal T22, and the output appearing there represents, successively, blade 52 as picked up on pickup 2, pickup 3, and pickup 4. The signals on terminals T20 and T22 are applied, respectively, to pulse shapers 46 and 47, previously discussed, to provide precise rectangular pulses to phase detector 48 which occur at precisely identical voltage levels of the input signals and whose pulse width is the same for both input signals. Any difference in time of occurrence of pulses is thus due only to the lead or lag of one input signal with respect to the other and thus not due to temperature differences, drift, or aging or the like. Thus precise phase detection can be achieved in phase detector 48 as will be described. These outputs are labeled in FIG. 12, B2 and B52 representing comparative measurements with respect to blades B2 and B52 as so designated in FIGS. 1 and 2. To examine more closely the physical relation of turbine 1 to switching current 28, reference is additionally made to FIG. 2 showing, progressively, the position of blades with respect to control pickup PC and blade position pickups P1–P4, it will be observed that the appropriate gating pulses are applied to FET's 1–6 to cause FET's 1–6 to pass the desired pairs of blade signals for comparison in phase detector 48. The blade numbering and signal labeling is in terms of signals developed by a particular blade as it passes control pickup PC, and, as previously explained, waveforms A are reference pulses derived from pulses PC from control pickup PC. Referring first to diagram *a* of FIG. 2, blade 52 is just passing pickup P1 and blade 52 is just passing pickup P2. Coincidentaly a keying pulse $L^1$ is applied to FET 1 which then passes an input pulse responsive to the passage of blade 2 onto terminal T20. The same keying pulse $L^1$ is also applied to FET 2 as it passes an input pulse from pickup P2 responsive to the passage of blade 52 and it appears on terminal T22. As turbine rotor 20 progresses in the indicated direction of rotation blades B1 and B2 pass control pickup PC. As indicated in FIG. 12 neither of these pulses produce a keying pulse. As blade 3 passes control pickup PC (FIG. 2B), pulse $M^1$ is generated and applied to FET 3 and FET 4. As such it permits the passage of signals from pickup 2 and pickup 3 and, as will be noted, pickup 2 responds to the passage of blade 2 and pickup 3 responds to the passage of blade 52. Again, the blade 2 or B2 signal appears on terminal 20 and the blade B52 signal appears on terminal T22. Next there is again rotation for two blade widths without a keying pulse. When, however, rotor 20 advances to the position shown in FIG. 2C with blade 7 having just passed control pickup PC, control pulse $N^1$ is applied to FET 5 and FET 6 to gate signals from pickup 3 to terminal T20 and from pickup 4 to terminal T22 and thus there appears on terminal 20 a signal derived as blade 2 passes pickup 3 and on terminal 22 there appears a signal derived as blade 52 passing pickup 4. As will be noted there is obtained three pairs of signals for each rotation of turbine 1 wherein each pair consists of a signal obtained by blade 2 passing one of a set of two pickups and blade 52 passing one of this set of two pickups. Thus with four pickups, as shown, we have, in effect, three sets of pickups and thus obtain the three sets of signals shown. Of course, with greater number of pickups, a greater number of sets of pickup signals can be obtained and thus more observation points for each revolution of the turbine.

The blade 2 or B2 (FIG. 12) signals are applied to pulse shaper 46, and rectangular pulses B2 are obtained as an output which are initiated at a very precise point as the signal changes polarity and which have a very precise pulse width. Similarly the output of pulse shaper 47, pulses B52 is a similarly obtained rectangular pulse derived from pulse B52. The train of B2 pulses and B52 pulses are thus of equal width but, depending upon lead or lag between pulses B2 and B52, B52 leads or lags pulse B. This lead or lag is detected in phase detector 48.

Figure 13:
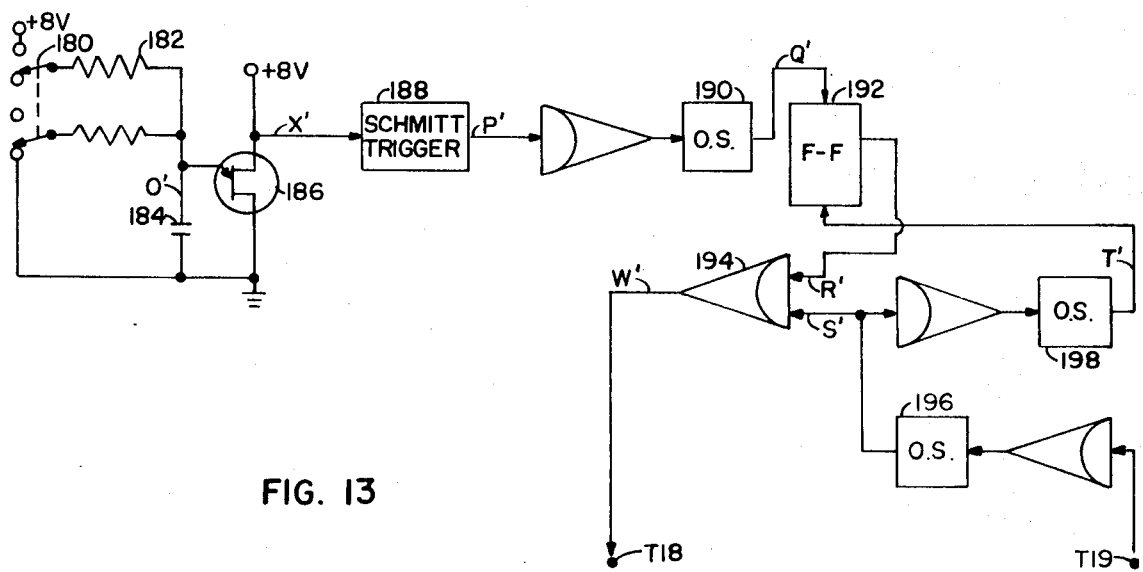
FIG. 13 is an electrical schematic circuit diagram of the manual selector shown in FIG. 1 which functions to step or add a count to the primary counter of the switch control shown in FIGS. 1 and 6 thereby to change the selection of blades being observed.
Figure 14:
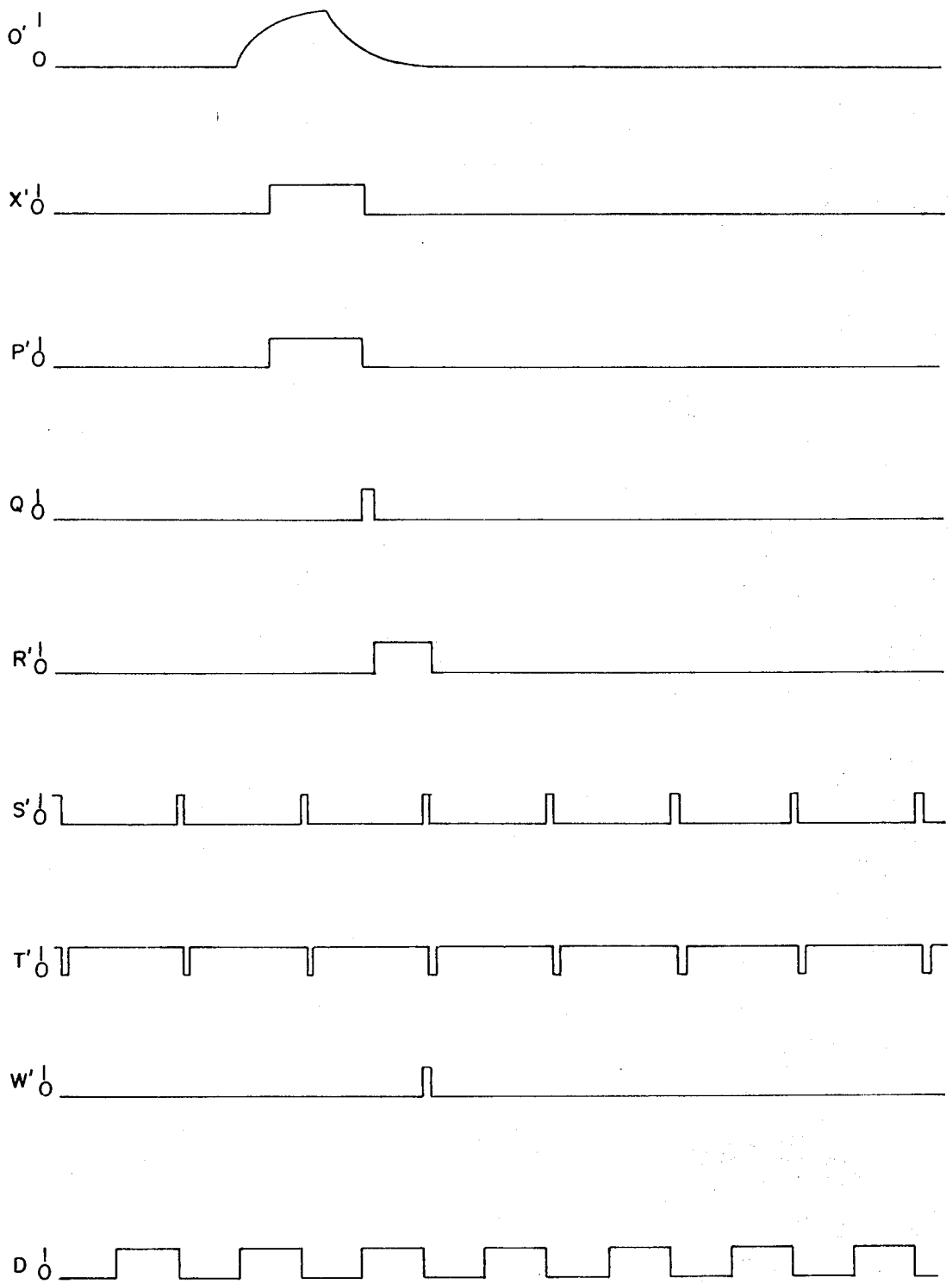
FIG. 14 is a timing chart illustrating the operation of the manual selector shown in FIG. 13.

In the preceding discussion and examples, blades 2 and 52 have been examined. The blades examined actually depend upon the basic count provided by primary counter 34 as it arbitrarily starts counting at a particular blade and continues to count for a full revolution or full count of 53 blades. As stated, the starting blade is purely arbitrary and thus by varying the blade which represents the No. 1 blade in the count the blades which are observed may also be varied. This is accomplished by manual selector 40 (FIG. 6) which is coupled to primary counter 34 and provides means for injecting an additional and false count into primary counter 34 and thus commences the count 1 blade sooner. Manual selector 40 is shown in greater detail in FIG. 13 and functions as follows: when push button switch 180 is at rest (as shown), the input of the manual selector is at ground potential. By pressing push button switch 180 to the upper position, +8 volts is applied to resistor 182. The result is that a pulse is generated across capacitor 184. It then appears as waveform $0^1$, shown in FIG. 14. Waveform $0^1$ connects to the exponential voltage rise across input capacitor 184 during the time that switch 180 is closed and the exponential decay when switch 180 is opened. Waveform $0^1$ triggers 186 which triggers 188 and results in a pulse shown as waveform $P^1$ of FIG. 14. $P^1$ is applied to one shot 190 which in turn generates waveform $Q^1$ and pulse $Q^1$ sets flip-flop 192 on the trailing edge of pulse $Q^1$ to produce a "1" level input 1 to AND-gate 194.

Pulses from flip-flop PF-1 of primary counter 34, pulses D, are applied to one shot 196. At the trailing edge of a pulse D one shot 196 produces a short duration pulse $S^1$ which lets the output of AND-gate 194 assume a "1" level shown as pulse $W^1$. This output of AND-gate 194, waveform $W^1$, is applied to the direct input of flip-flop PF-1 of primary counter 34. This pulse introduces a false pulse into primary counter 34 and causes it to count an extra blade. This causes a new set of blocks to be observed, blades corresponding to blades $B^3$ and $B5^3$ as shown in FIGS. 1 and 2.

Waveform $S^1$ is also applied to one shot 198 and at the trailing edge of waveform $S^1$ flip-flop 192 is reset by waveform $T^1$ going from "1" level to the "0" level.

The circuit may be stepped completely around the turbine, stepping one blade set each time switch 180 is pressed and released and thus all blades checked. Stepping is in the direction which is opposite to the direction of rotation.

Phase detector 48, shown in FIG. 15, functions to phase or time compare two blade signals, S1 and S2, which are supplied phase detector 48 on terminals T24 and T26. Phase detector 48 provides two outputs, one being a triangular or saw tooth wave output of a polarity indicating lead or lag of signal S1 with respect to S2 and of a magnitude of the lead or lag. The second output is a stepped wave output which serves to identify particular input signals. The input signals S1 and S2 are rectangular pulses as shown in FIG. 12 and are each of a fixed width and initiated at the time that an input blade signal phase changes polarity, that is change from a + to a − voltage (FIG. 5). This occurs at a time when the center of a blade is positioned in a balanced position with respect to a given magnetic pickup, in other words, when the flux changes from an increasing flux to a decreasing flux.

Figure 16:
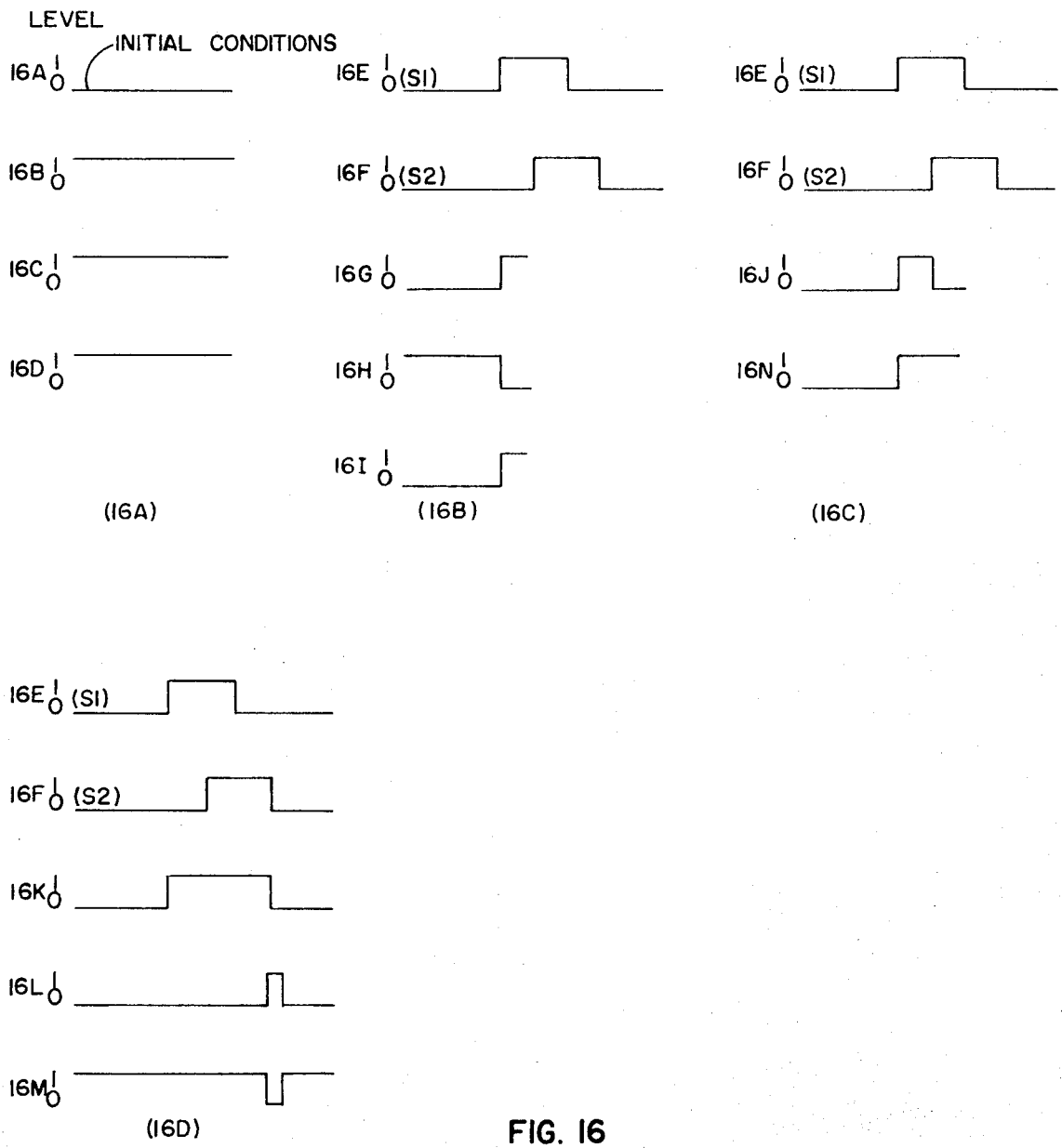
FIG. 16 is a timing chart illustrating waveforms generated in the voltage selector shown in FIG. 15.

Phase detector 48 basically consists of voltage selector 50, sweep circuit 52 and raster circuit 54. Pertinent waveforms are shown in FIG. 16. They are labeled alphabetically in the order in which they appear thereon and are referred to in the text with the prefix 16. The waveform designations also appear on FIG. 15 to indicate the circuit location of their generation. Waveform A of FIG. 16 indicates the reference representing the initial conditions of the circuit before a pulse arrives.

Considering first voltage selector 50 and conditions initially consisting, it is to be noted that the output of inverter 222 of sweep circuit 52, waveforms 16B, is at a "1" level and this appears at the direct set inputs of flip-flops 200 and 202. Similarly the reset outputs 16C from flip-flop 200 and 16D from flip-flop 202, are at the "1" level. Output 16C is applied to the first input of AND-gate 208 to prime AND-gate 208 and output 16D is applied to the second input of AND gate 206 to prime AND-gate 206. Output 16C is also applied to input 1 of 3-input AND-gate 212 and output 16D is applied to input 1 of 3-input AND-gate 214.

Assume first that a phase difference does in fact exist between input pulses S1 and S2 as shown in waveforms 16E and 16F and that these inputs appear on terminals T24 and T26, respectively. As shown, it is further assumed that signal S1 or 16E leads signal S2 or 16F. Signal S1, thus appears first and its leading edge is illustrated in 16G as applied to input 1 of AND gate 206. This signal is also applied to input 1 of OR gate 208 of sweep circuit 52. Signal S1 is also applied to inverter 210 which provides a "0" level to input 2 of AND gate 212 to thus disable AND gate 212. The result is that S1 triggers AND gate 206 to apply a direct set input to input DS of flip-flop 200. This causes flip-flop 200 to "set" which causes its reset output terminal 1 to go to a "0" level as shown in 16H. This "0" level condition is applied to 1 of AND-gate 212 and to input 1 of AND-gate 208 to block both of these gates. Signal S1, now at the "1" level (16I¹) is also applied to input 2 of AND-gate 214. In the absence of an S2 input to inverter 216 there has been previously established a "1" input level on input 3 of AND-gate 214 and by the reset output of flip-flop 202 there is provided a "1" input on terminal 1 of AND-gate 214. Thus AND-gate 214 is gated by input pulse S1 to apply a "1" level input to NOR-gate 218. At the same time and by virtue of the S1 output to NOR-gate 208, the latter applies an input to one shot 220 of sweep circuit 52, however, no output appears until the end of the output of NOR-gate 208, marking the end of both S1 and S2 pulses, as will be explained.

Next, to consider the effect of the arrival of S2, (16F) on terminal T26 at a later time, it is to be noted that it is blocked by AND-gate 208 which is still blocked in view of the fact that flip-flop 200 has been set and its reset "0" level appears on input 1 of AND-gate 208. Likewise, signal S2 is blocked by AND-gate 212, which has the same "0" input from flip-flop 200. However, both signals, S1 and S2 do pass through NOR-gate 208 and provide an output 16K¹ which is a composite of pulses S1 and S2, with a leading edge corresponding to the leading edge of S1 and a trailing edge corresponding to the trailing edge of S2. The trailing edge triggers one shot 220 to provide a short positive pulse 16L which is inverted by inverter 222 as pulse 16M. The output of inverter 222 is then applied to flip-flops 200 and 202, thus resetting them.

As stated above, input pulse S1 is passed by AND-gate 214 to input 1 of NOR-gate 218. This produces a "0" level output of NOR-gate 218 which in turn applies a "0" output back to input 2 of NOR-gate 236, the other input, input 1 of NOR-gate 236 being from the input of AND-gate 212 is also "0," which makes its output "1." The "1" output of NOR-gate 236 is fed back to input 2 of NOR-gate 218 and thus the output of gate 218 remains at the "1" level until AND-gate 212 is gated on which will not occur so long as signal S1 leads signal S2 inasmuch as input 1 to AND-gate 212 does not return to a "1" condition until the reset of flip-flop 200 occurs and this reset does not occur until after signal S2, another "1" input to 212, has gone to "0." Thus the combination of NOR-gates 218 and 236 comprise a latching circuit 229 which provides a "0" output from NOR-gate 218 and a "1" output from NOR-gate 236 so long as there is not a switch in the phase relation of input pulses S1 and S2 whereby input pulse S1 would lag S2. If this should occur the operation of latching circuit 229 would reverse as follows. With S1 lagging S2, S2 would be passed by AND-gate 208 to set flip-flop 202 which would then block AND-gate 214 but AND-gate 212 would pass signal S2 to provide a "1" input on NOR-gate 236 and this would cause the latching circuit to reverse state and thus provide a "0" output of NOR-gate 236 and a "1" output of NOR-gate 218.

Considering the first state discussed, that is with signal S1 leading signal S2 and a "1" output on NOR-gate 236 this is applied to interface 230, which causes it to have a −9 volt output which is applied to the gates inputs of field effect transistors (FET 5) 232 and 234 shutting them off. Simultaneously, a "0" output from NOR-gate 218 causes a "0" signal to appear at the output of interface 236 which is applied to FET 238 and 240 and they conduct. The result is a +1.5 volts, applied through conducting FET 238 and resistor 242 to terminal T32, there being no path through "OFF" FET 232 to ground.

Thus in the fashion described voltage selector 50 has provided a positive voltage output at terminal T32 for a condition of S1 leading S2. If the reverse occurs, that is S1 lags S2 the signal polarity levels at the outputs of NOR gates 218 and 236 will be reversed and there will be a "1" level at the output of NOR-gate 218 and a "0" level at the output of 236. This in turn will cause a −9 volts to be applied by the output of interface 236 to the gate of FETs 238 and 240 shutting them off and the "0" output from NOR-gate 236 repeated by interface 230 and applied to the gate input of FET 232 and 234 permitting them to conduct. This in turn blocks the positive input through FET 238 and permits the −1.5 volts to be applied through FET 234 and resistor 244 to terminal T32.

Figure 17:
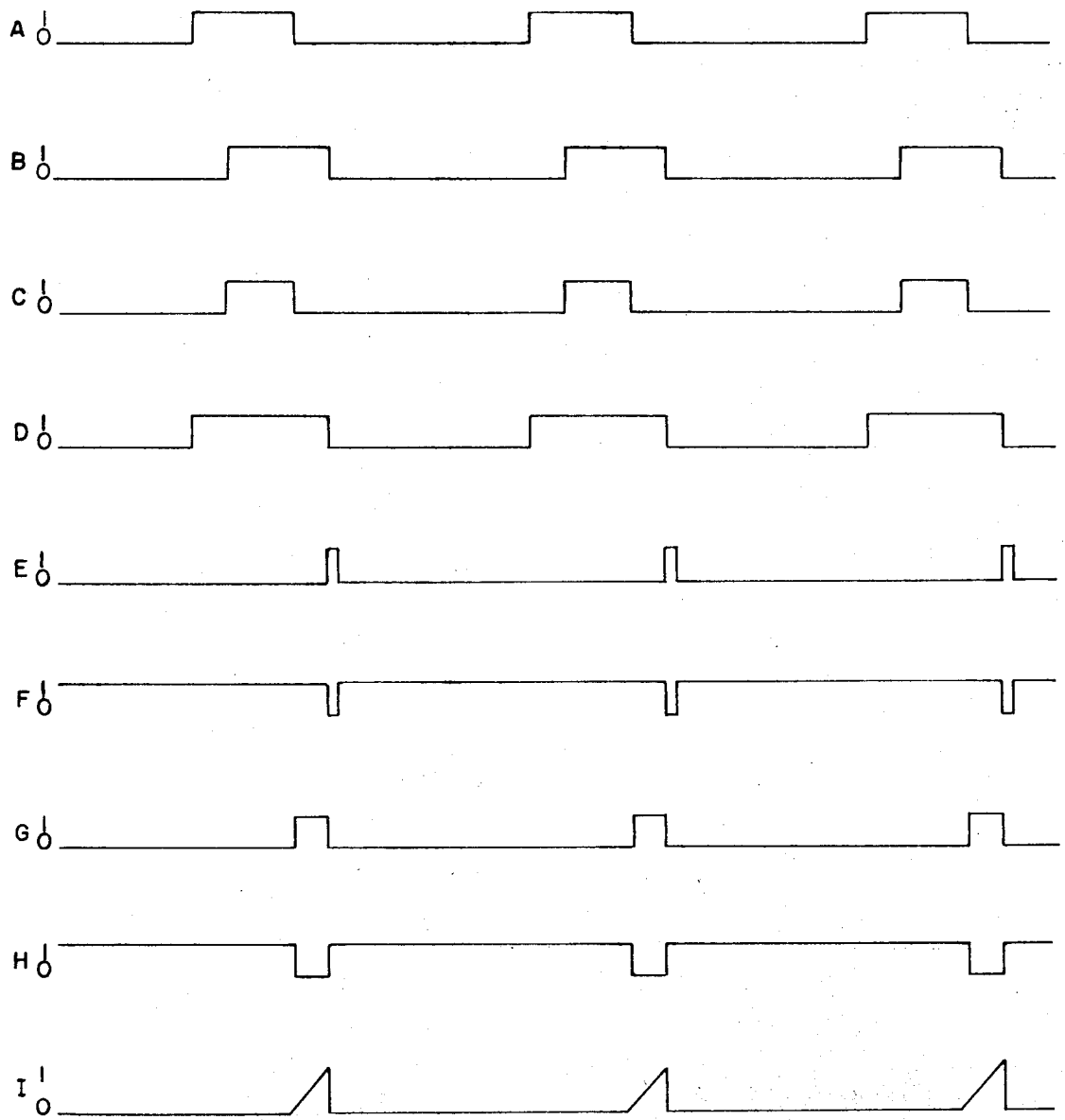
FIG. 17 is a timing chart illustrating the waveforms appearing in the sweep circuit shown in FIG. 15.

There has been described above in connection with the description of voltage selector 50 the generation of a positive output when pulse 1 leads pulse 2 and a negative output when pulse 2 leads pulse 1. The following description is of sweep circuit 52 which functions to energize operational amplifier 250 through the positive or negative voltages from voltage selector 50 pass for a duration which is directly proportional to the lead or lag of input pulse 2 with respect to input pulse 1 and thus the phase angle between the two inputs signals. Pertinent waveforms are shown in FIG. 17.

The input pulses S1 (17A) and S2 (17B) are applied to AND-gate 252 and NOR-gate 208. Thus the output of AND-gate 252 is at a "1" level when both of its inputs are coincident as shown in FIG. 17C. The output signal from AND-gate 252 is applied to the clock input C of flip-flop 256 which is set on the trailing edge of this pulse. Thus flip-flop 256 is triggered on the trailing edge of the leading pulse. The trailing edge of the output pulse 17D from NOR-gate 208, representing the trailing edge of the lagging pulse is applied to one shot 220 to provide a positive output pulse 17E. This pulse is inverted by inverter 222 to provide "0" level pulse 17F and it is applied to the reset input of flip-flop 256. Thus flip-flop 256 is set a length of time equal to the difference in time between the trailing edges of input pulses S1 and S2 and thus the time that signal S1 leads signal S2 or vice-versa, as the case may be. The phase or time difference appears as pulse output 17G of flip-flop 256 and is applied to the input of interface 260 where it is converted from a plus to a negative pulse 17H which is then fed to the gate input of FET 262 of integrator 263. This turns FET 262 off during this period of lead or lag. FET 262 is connected in parallel with timing capacitor 264 between the input and output of operational amplifier 250 which functions as an integrator with either a +1.5 or −1.5 volts, depending upon the polarity on terminal T32, and operates during the time that FET 262 is turned off. During the remaining time, FET 262 is turned on and grounds out capacitor 264. Triangular or sawtooth pulse 17I, the output of integrator 263, appears on terminal T34. The amplitude of pulse 17I depends upon the charging time permitted, which of course depends upon the length of pulse 17H which depends on the phase difference between input pulses. The polarity of the output, of course, depends upon the polarity on terminal T32, which is plus when S1 leads S2 and minus when S1 lags S2. Sawtooth pulse 17I is fed to the oscilloscope display 56 as a "X" axis input to provide horizontal traces, TR1, 2 and 3 shown in FIG. 3.

Raster circuit 54 functions to provide 3 voltage levels to the Y input of the oscilloscope 56, one for each set of observations illustrated by the three blade positions shown in FIGS. 2 a, b and c. Thus the beam of the oscilloscope 56 is distinctly positioned vertically for each position being observed and thus by virtue of the X inputs to oscilloscope 56 provided by sweep circuit 52 there is presented a display as illustrated in FIGS. 3a and 3b in which each horizontal line is of a length corresponding to the lead or lag of a particular blade with respect to another particular blade and the position of the lines indicates the particular measurement. Thus, for example, in FIGS. 3a and 3b, the bottom trace TR1 is derived from pickups P1 and P2, middle trace TR2 from pickups P2–P3 and top trace TR3 from pickups P3-P4. In FIG. 3a no vibration is detected in any of the positions whereas in FIG. 3b the traces show that vibrations are present and that S1 leads S2 by an amount proportional to the trace lengths in traces TR1 and TR3 and that S1 lags S2 in trace TR2 by an amount proportional to the length of trace TR2.

Figure 18:
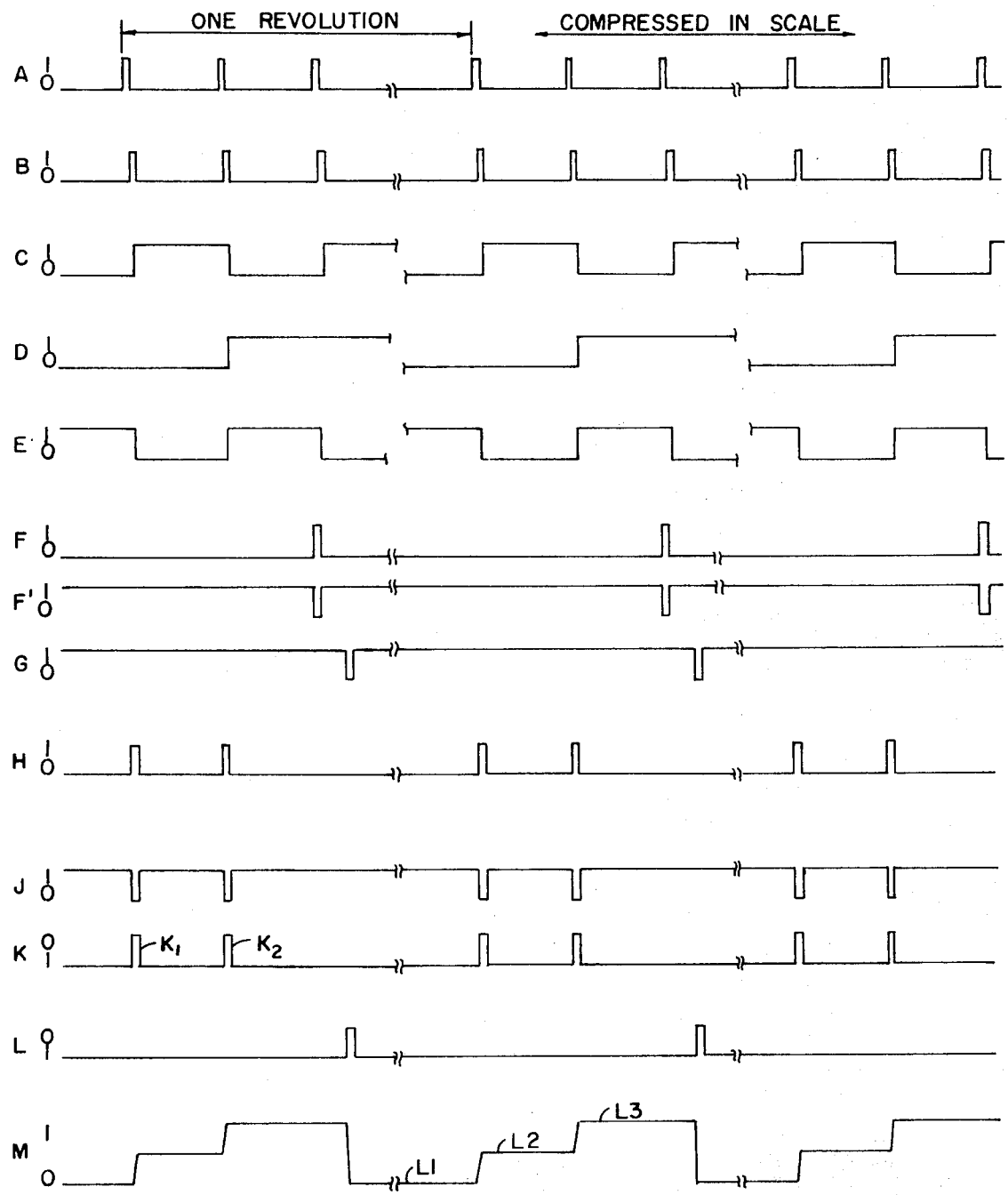
FIG. 18 is a timing chart illustrating waveforms appearing in the raster circuit shown in FIG. 15.

To examine the operation of raster circuit 54, reference is additionally made to FIG. 18 showing waveforms pertinent to this circuit.

The input to raster circuit 54 is waveform 18A which is an output from one shot 220 of sweep circuit 52. This is a narrow pulse which occurs each time that a set of pulses S1 and S2 are applied to terminals T24 and T26. Pulse train 18A is fed to one shot 266 which provides a narrow pulse output 18B commencing with the trailing edge of each pulse 18A. Pulse train 18B is applied to input 1 of AND-gate 268, the set input of flip-flop 270 and input 1 of AND-gate 272. Flip-flop 270 is triggered on the trailing edge of pulse 18B to provide an output 18C which is applied to the set input of flip-flop 274 and to input 2 of AND-gate 272. Similarly, a set output 18D of flip-flop 274 is applied to input 3 of AND-gate 272. Thus, AND-gate 272 becomes true, or reaches a "1" output level every third input pulse to one shot 266 to provide an output 18E. Thus pulse 18E, which is derived from each set of input pulses received by phase detector 50, occurs each third set of input pulses received. Flip-flops 270 and 274 are reset every third pulse per revolution by reset pulse 18G which is obtained after every third pulse per revolution from the K$^1$ pulse on FIG. 11. The K$^1$ pulse triggers for the third observation position of the blades and is fed through an inverter 278 and one shot 276 which triggers on the trailing edge of pulse K$^1$. This trailing edge of pulse K$^1$ occurs after the third observation, TR3, occurs and before the first observation position, TR1. Hence the flip-flops are reset after every third pulse of every revolution. The output of one shot 276, 18G, is the reset output so that the pulse from 18E is the right polarity to reset flip-flops 270 and 274. The output of AND-gate 272, waveform 18F, is inverted by inverter 280 to provide waveform 18F$^1$ which is at a "1" level except every third pulse. Thus by applying waveform 18F$^1$ to input 2 of AND-gate 268, AND-gate 268 provides an output 18H which is at a "0" level each third pulse and at a "1" level each two pulses out of three applied to input 1. The output of AND-gate 268 is inverted in inverter 282 to provide output 18J and the polarity of 18J is reversed by interface 284 and as 18K is then applied to the gate input of FET 286. Thus the sets of two pulses appearing as K1 and K2 of 18K as two "0" level pulses allow operational amplifier 288 to be keyed on to integrate an applied −1.5 volts for the period of each pulse. This potential is applied through resister 290 and FET 286 to operational amplifier 288 during the period of each of the two pulses 18K. Integration by operational amplifier 288 is recycled or commenced each third pulse per revolution applied to the logic selector circuit 42 by virtue of pulse train 18L. Pulse train 18L appears at the output of interface 292 and is the polarity reversed output of one shot 276. Pulses 18L, being pulses which rise from a minus level to the "0" level, gate the input of FET 294, thus shortening out integration capacitor 296 for the duration of each pulse 18L. Thus as shown in waveform 18M, appearing at the output of operational amplifier 288, initially and with a first pulse 18L, operational amplifier 288 is shorted between input and output and the output is at a "0" or "L1" level. This continues until the first of the pulses shown in 18K, pulse K1, occurs which gates FET 286 to provide for the duration of this pulse an input which produces a second level L2 of waveform 18M. Next, the second pulse K2 of 18K gates FET 286, and operational amplifier 288 again integrates with the result that there is provided a third level L3 of waveform 18M as an output of operational amplifier 288. Thus the circuit holds "0" volts for a short time, integrates once and holds a second and higher position, then integrates and holds a second time and then resets to "0" and repeats the sequence. The output of operational amplifier 288, waveform 18M appears on terminal T36 and is applied to the Y input of oscilloscope 56 to provide the different vertical levels for the three input measurements illustrated in FIG. 3.

Figure 19:
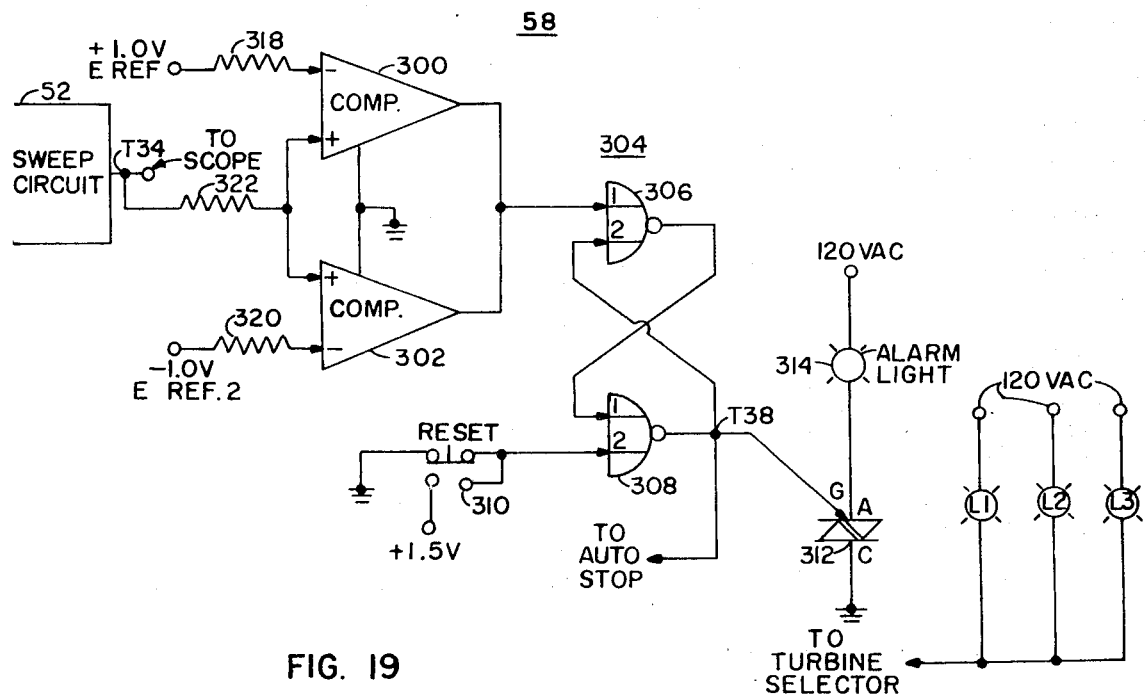
FIG. 19 is an electrical schematic circuit diagram of an alarm system which is energized when a critical vibratory condition is sensed by the system.

Alarm 58, shown in detail in FIG. 19, provides an alarm output either to light a light or ring a bell, as well as to shut down equipment when a critical vibration is determined by phase detector 48. For purposes of illustration, it will be assumed that an alarm light 314 is used. Alarm circuit 58 basically consists of a plus voltage comparator 300, a minus voltage comparator 302 and a latching circuit 304 which in turn consists of NOR-gates 306 and 308. Initially, and with no output from comparators 300 and 302, latching circuit 304 would be reset by the momentary operation of reset switch 310 which applied a +1.5 volts to terminal 2 of NOR-gate 308. With initially a "0" input to input 1 of NOR-gate 306 and the input 2 inputs of the NOR gates cross-coupled to outputs, the circuit would be latched or in stable condition with "0" level on the output of NOR-gate 208 and a "1" level on the output of NOR-gate 306. Thus there is a "0" voltage on output terminal T38 and therefore triac 312 is unenergized and no alarm provided by alarm light 314.

Lights L1, L2 and L3 are energized one at a time from turbine selector 24, FIG. 1, to indicate when compressor is being monitored. Thus in conjunction with alarm light 314, the operator can tell in which turbine an alarm has occurred.

Comparators 300 and 302 are biased on their negative terminals by +1.0 volts applied through resistor 318 to comparator 300 and by −1.0 volts through resistor 320 to comparator 302. Input signals from terminal T34 are applied through resistor 322 to the positive inputs of both comparators and the outputs are connected together and connected to input 1 of NOR-gate 306.

To examine the operation of the circuit we will assume that latching circuit 304 has been previously preset as described above and then there appears on terminal T34 a signal which exceeds the alarm reference of the circuit, 1.0 volts, and which is positive. This voltage is then applied through resistor 322 to the positive inputs of comparators 300 and 302 and positive comparator 300 detects a difference and provides a "1" level output to input 1 of NOR-gate 306. Prior to the receipt of this input, as noted above, there was a "0" level on inputs 1 and 2 and a "0" output on the output terminal of NOR-gate 306. Thus, the effect of the applied signal is to cause the output of NOR-gate 306 to go to a "0" level which is coupled over to input 1 of NOR-gate 308. Then with a "0" input on both inputs 1 and 2 of NOR-gate 308 there is a "1" level at the output of NOR-gate 308 which is coupled back to input 2 of NOR-gate 306 to latch the circuit with a "1" output even though he triggering signal on input 1 of NOR-gate 306 is removed. The "1" level on the output of NOR-gate 308, of course, serves to trigger triac 312 and energize alarm light 314. The circuit will remain in this state with alarm light 314 on until the circuit is initially reset by switch 310 and thus it is reasonably assured that an operator's attention will be obtained. The operation would have been similar if the signal on T34 was negative and had exceeded the 1.0 volt reference level of the circuit. In this instance, comparator 302 would have been operated and a "1" level input applied to NOR-gate 306.

The measurement system thus described provides a practical yet extremely accurate measurement system for detecting harmful blade vibration in turbines and rotary compressors. with as few as three measurement pickups, comparative blade vibrations can be examined including a comparative measurement of each blade with at least one other blade. While five magnetic pickups are shown, one to provide a reference and four for actual measurement purposes, it is to be appreciated that a fewer or greater number may be employed and that the reference output may be obtained from one of the measurement pickups instead of from a separate reference pickup. Means are provided to shape the magnetically sensed signals in such a fashion as to preserve their time identity. Phase or time comparison of input signals is accomplished by means which detects the sense and magnitude of any time difference between the occurrence of input signals and develops indicating voltages which are in such form as to readily display on an oscilloscope as intelligent data without further translation.

What is claimed as invention:

1. A system for measuring rotor blade vibration in a turbine, or compressor, comprising:
   A. a plurality of sensors positioned in spaced relation around and in close proximity to said blades of a said turbine or compressor, each sensor comprising means for providing an electrical output which is a function of blade motion with respect to a said sensor;

B. switching means responsive to outputs of said sensors for selectively providing first and second blade signal outputs, simultaneously, corresponding to outputs of first and second of said sensors and responsive to the passage of a selected pair of blades by said first and second of said sensors;

C. phase detection means responsive to said outputs of said switching means for providing an output potential of an amplitude and polarity which is a function of any lead or lag of one blade signal output with respect to another blade signal output simultaneously observed; and D. indicating means responsive to said phase detection means for indicating the lead or lag of one blade signal output with respect to another and for indicating the magnitude of any such lead or lag.

2. A system for measuring rotor blade vibration as set forth in claim 1 wherein said phase detection means comprises:

A. voltage selection means responsive to said first and second blade signal outputs of said switching means for providing a first polarity signal when said first output leads in phase said second output and providing a second and opposite polarity signal when said first output lags said second output; and B. phase comparison means responsive to said first and second outputs of said switching means for providing a third output signal which is function of the time difference or phase of said first and second outputs of said switching means.

3. A system for measuring rotor blade vibration as set forth in claim 2 wherein said phase detection means further comprises output means responsive to the output of said voltage selection means and phase comparison means for providing an electrical output which is of a polarity which is a function of the polarity of said voltage selection means and of a duration which is a function of the output of said phase comparison means.

4. A system for measuring rotor blade vibration as set forth in claim 3 wherein said output means comprises means for generating a sawtooth wave.

5. A system for measuring rotor blade vibration as set forth in claim 4 wherein:

A. said switching means comprises means for providing a series of sets of said first and second blade signal outputs in sequence representative of observations of a particular pair of blades at a plurality of positions during a cycle of rotation of a said compressor or turbine; and B. said phase detection means further comprises signal identification means responsive to each said set of blade signal outputs for providing an identifying and discrete voltage output coincident with the occurrence of a said set of blade signal outputs whereby each set may be identified.

6. A system for measuring rotor blade vibration as set forth in claim 5 wherein said indicating means comprises an oscilloscope having first axis control means connected to and controlled by the output of said output means of said phase detection having second axis control means connected to and controlled by the output of said signal identification means whereby discrete traces are generated on said oscilloscope for each said set of blade signal outputs.

7. A system for measuring rotor blade vibration as set forth in claim 2 further comprising pulse shaping means in series between a said sensor and said phase detection means for providing an output pulse of one polarity which is of fixed width and which commences at an identical level point on the leading edge of each output of a said sensor.

8. A system for measuring rotor blade vibration as set forth in claim 7 wherein each said pulse shaper comprises:

A. a first voltage comparator having first and second inputs and an output and includes a diode connected between said first input and said output, whereby said output is prevented from going lower in value than said first input;

B. a reference voltage of the polarity of the input of said first input being applied to said second input of said first comparator;

C. a second voltage comparator having first and second inputs and an output and includes a diode connected between said last named first input and said last named output, whereby said last named output is prevented from going lower in value than said last named first input;

D. a zero reference voltage being applied to said second input of said second comparator;

E. first and second NOR gates, a first input of said first NOR gate being connected to the output of said first comparator, the first input of said second NOR gate being connected to the output of said second comparator, the second input of said second NOR gate being connected to the output of said first NOR gate and the second input of said first NOR gate being connected to the output of said second NOR gate; and a one shot multi-vibrator being connected to the output of said second NOR gate;

Whereby an alternating current signal applied to said first input of said comparator provides a rectangular pulse output.

9. A system for measuring rotor blade vibration as set forth in claim 6 further comprising alarm means responsive to the level of output of said electrical output of said phase detection means for providing a signal whenever a predetermined level occurs.

10. A system for measuring rotor blade vibration as set forth in claim 9 further comprising at least one additional said turbine and plurality sensors related thereof, and including turbine selection means for selectively interconnecting the sensors related to a particular said turbine to said switching means.

11. A system for measuring rotor blade vibration as set forth in claim 10 wherein said alarm means comprises means responsive to said turbine selection means for indicating the particular turbine being monitored.

* * * * *